United States Patent
Twitto et al.

(10) Patent No.: US 10,860,249 B2
(45) Date of Patent: Dec. 8, 2020

(54) SOLID STATE DISK (SSD) CONTROLLER AND DATABASE

(71) Applicant: PLIOPS LTD., Tel Aviv (IL)

(72) Inventors: Moshe Twitto, Givat Shemuel (IL); Yuval Rochman, Ramat Gan (IL); Avraham Meir, Rishon Le zion (IL)

(73) Assignee: Pliops Ltd., Tel Aviv (IL)

( * ) Notice: Subject to any disclaimer, the term of this patent is extended or adjusted under 35 U.S.C. 154(b) by 0 days.

(21) Appl. No.: 16/231,649

(22) Filed: Dec. 24, 2018

(65) Prior Publication Data

US 2019/0384530 A1 Dec. 19, 2019

Related U.S. Application Data

(60) Provisional application No. 62/744,264, filed on Oct. 11, 2018, provisional application No. 62/732,576, filed on Sep. 18, 2018, provisional application No. 62/610,244, filed on Dec. 25, 2017.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0673; G06F 3/0604
See application file for complete search history.

(56) References Cited

U.S. PATENT DOCUMENTS

| | | | |
|---|---|---|---|
| 5,559,956 | A | 9/1996 | Sukegawa |
| 5,598,370 | A | 1/1997 | Niijima |
| 6,377,500 | B1 | 4/2002 | Fujimoto |
| 6,684,289 | B1 | 1/2004 | Gonzalez |
| 7,171,513 | B2 | 1/2007 | Gonzalez |
| 9,898,224 | B1 * | 2/2018 | Marshak ............... G06F 3/0604 |
| 2016/0357743 | A1 * | 12/2016 | Swaminathan ..... G06F 16/2255 |
| 2019/0138612 | A1 * | 5/2019 | Jeon .................... G06F 16/2255 |

OTHER PUBLICATIONS https://www.storagereview.com/ssd-controller/, 2010 (Year: 2010).*

* cited by examiner

*Primary Examiner* — Arvind Talukdar
(74) *Attorney, Agent, or Firm* — Reches Patent

(57) ABSTRACT

There may be provided, systems, method and non-transitory computer readable media for accessing a key value pair stored in a solid state drive (SSD) memory, the method may include calculating, by a SSD memory controller and based on an input key, a first bucket identifier and a first inter-bucket value; determining a block cluster that stores the key pair value, based on the first bucket identifier, the first inter-bucket value and first metadata of a first data structure; calculating, based on the input key, a second bucket identifier and a second inter-bucket value; determining key pair value retrieval information, based on the second bucket identifier, the second inter-bucket value and second metadata of a second data structure; wherein the second data structure is allocated to the block cluster; and retrieving at least the value of the key pair value based on the key pair value retrieval information.

33 Claims, 18 Drawing Sheets

Key1 = 0100111

Key2= 0110010

Key3 = 1011001

Key4 = 0010010

Key5 = 1011010

SOLID STATE DISK (SSD) CONTROLLER AND DATABASE

CROSS REFERENCE

This application claims priority from U.S. provisional patent Ser. No. 62/610,244, filing date Dec. 25, 2017, from U.S. provisional patent Ser. No. 62/732,576 filing date Sep. 18, 2018 and U.S. provisional patent Ser. No. 62/744,264 filing date Oct. 11, 2018—all being incorporated herein by reference.

BACKGROUND

There is a growing need to provide efficient manners for controlling SSD.

SUMMARY

There may be provided a method for accessing a key value pair stored in a solid state drive (SSD) memory, the method may include receiving by a SSD controller an input value; applying a first hash function on the input value to provide a first hash result; determining, based on the first hash result, a bucket number and a slot locator; determining a logical address of the key value pair associated with a logical slot identified by the bucket number and the slot locator; determining a physical address of the key value pair based on the slot locator; and accessing the key value pair using the physical address of the key value pair; wherein the slot locator may be a binary sequence that may be indicative of a number of colliding keys that share a first hash result value.

There may be provided a method for accessing a key value pair stored in a solid state drive (SSD) memory, the method may include receiving by a SSD controller an input value; converting the input value to an intermediate value; applying a first hash function on the input value to provide a first hash result; determining, based on the first hash result, a bucket number and a slot locator; determining a logical address of the key value pair associated with a logical slot identified by the bucket number and the slot locator; determining a physical address of the key value pair based on the slot locator; and accessing the key value pair using the physical address of the key value pair; wherein the slot locator may be a binary sequence that may be indicative of a number of colliding keys that share a first hash result value.

There may be provided a method for accessing a key value pair stored in a solid state drive (SSD) memory, the method may include receiving by a SSD controller an input value; applying a first hash function on the input value to provide a first hash result; determining, based on the first hash result, a bucket number and a slot locator; determining a logical address of the key value pair associated with a logical slot identified by the bucket number and the slot locator; determining a physical address of the key value pair based on the slot locator; and accessing the key value pair using the physical address of the key value pair; and wherein the determining of the physical address may include (a) counting from a most significant bit of the slot locator the number of zero bits that equals the value of the logical address to find the corresponding logical slot; (b) determining a number of colliding keys in a logical slot as a number of one bits that follows the certain zero bit corresponding to the Lslot; and (c) setting an identifier of a physical slot that stores the key value pair as a number of set bits that precede the certain bit.

There may be provided a method for accessing a key value pair stored in a solid state drive (SSD) memory, the method may include receiving by a SSD controller an input value; applying a first hash function on the input value to provide a first hash result; determining, based on the first hash result, a bucket number and a slot locator; determining a logical address of the key value pair associated with a logical slot identified by the bucket number and the slot locator; determining a physical address of the key value pair based on the slot locator; and accessing the key value pair using the physical address of the key value pair; wherein the determining of the physical address of the key value pair may include applying a permutation that provides an order of a physical address of the key value pair, wherein the permutation maps different keys to different values.

The method may include receiving a new key that may be associated with a new colliding logical slot and recalculating the permutation to provide a new permutation that maps the new key and current keys to different values.

There may be provided a method for accessing a key value pair stored in a solid state drive (SSD) memory, the method may include receiving by a SSD controller an input value; applying a first hash function on the input value to provide a first hash result; determining, based on the first hash result, a bucket number and a slot locator; determining a logical address of the key value pair associated with a logical slot identified by the bucket number and the slot locator; determining a physical address of the key value pair based on the slot locator; and accessing the key value pair using the physical address of the key value pair; wherein the determining of the physical address may include scanning a tree of keys mapped to a logical slot, wherein nodes of the tree may be indicative of indexes with the keys that differentiate between one key to another.

There may be provided a method for accessing a key value pair stored in a solid state drive (SSD) memory, the method may include receiving by a SSD controller an input value; applying a first hash function on the input value to provide a first hash result; determining, based on the first hash result, whether the key value pair may be associated with metadata stored in a main data structure or an outcast data structure; wherein when determining that the key value pair may be associated with the main data structure then determining a bucket number and a slot locator; determining a logical address of the key value pair associated with a logical slot identified by the bucket number and the slot locator; determining a physical address of the key value pair based on the slot locator; and accessing the key value pair using the physical address of the key value pair.

There may be provided a non-transitory computer readable medium that stores instructions for receiving by a solid state drive controller an input value; applying a first hash function on an input value to provide a first hash result; determining, based on the first hash result, a bucket number and a slot locator; determining a logical address of a key value pair associated with a logical slot identified by the bucket number and the slot locator; determining a physical address of the key value pair based on the slot locator; and accessing the key value pair using the physical address of the key value pair; wherein the slot locator may be a binary sequence that may be indicative of a number of colliding keys that share a first hash result value.

There may be provided a non-transitory computer readable medium that stores instructions for receiving by a solid state drive controller an input value; applying a first hash function on an input value to provide a first hash result; determining, based on the first hash result, a bucket number and a slot locator; determining a logical address of a key value pair associated with a logical slot identified by the bucket number and the slot locator; determining a physical address of the key value pair based on the slot locator; and accessing the key value pair using the physical address of the key value pair; wherein the determining of the physical address may include (a) counting from a most significant bit of the slot locator the number of zero bits that equals the value of the logical address to find the corresponding logical slot; (b) determining a number of colliding keys in a logical slot as a number of one bits that follows the certain zero bit corresponding to the Lslot; and (c) setting an identifier of a physical slot that stores the key value pair as a number of set bits that precede the certain bit.

There may be provided a non-transitory computer readable medium that stores instructions for receiving by a solid state drive controller an input value; applying a first hash function on an input value to provide a first hash result; determining, based on the first hash result, a bucket number and a slot locator; determining a logical address of a key value pair associated with a logical slot identified by the bucket number and the slot locator; determining a physical address of the key value pair based on the slot locator; and accessing the key value pair using the physical address of the key value pair; wherein the determining of the physical address may include applying a permutation that provides an order of a physical address of the key value pair, wherein the permutation maps different keys to different values.

There may be provided a non-transitory computer readable medium that stores instructions for receiving a new key that may be associated with a new colliding logical slot and recalculating the permutation to provide a new permutation that maps the new key and current keys to different values.

There may be provided a non-transitory computer readable medium that stores instructions for receiving by a solid state drive controller an input value; applying a first hash function on a input value to provide a first hash result; determining, based on the first hash result, a bucket number and a slot locator; determining a logical address of a key value pair associated with a logical slot identified by the bucket number and the slot locator; determining a physical address of the key value pair based on the slot locator; and accessing the key value pair using the physical address of the key value pair; wherein the determining of the physical address may include scanning a tree of keys mapped to a logical slot, wherein nodes of the tree may be indicative of indexes with the keys that differentiate between one key to another.

There may be provided a non-transitory computer readable medium that stores instructions for receiving by a solid state drive controller an input value; applying a first hash function on an input value to provide a first hash result; determining, based on the first hash result, whether a key value pair may be associated with metadata stored in a main data structure or an outcast data structure; wherein when determining that the key value pair may be associated with the main data structure then determining a bucket number and a slot locator; determining a logical address of the key value pair associated with a logical slot identified by the bucket number and the slot locator; determining a physical address of the key value pair based on the slot locator; and accessing the key value pair using the physical address of the key value pair.

There may be provided a system for accessing a key value pair stored in a solid state drive (SSD) memory, the system may include an SSD controller that may be configured to receive by an input value; apply a first hash function on the input value to provide a first hash result; determine, based on the first hash result, a bucket number and a slot locator; determine a logical address of the key value pair associated with a logical slot identified by the bucket number and the slot locator; determine a physical address of the key value pair based on the slot locator; and access the key value pair using the physical address of the key value pair; wherein the slot locator may be a binary sequence that may be indicative of a number of colliding keys that share a first hash result value.

There may be provided a system for accessing a key value pair stored in a solid state drive (SSD) memory, the system may include an SSD controller that may be configured to receive by an input value; apply a first hash function on the input value to provide a first hash result; determine, based on the first hash result, a bucket number and a slot locator; determine a logical address of the key value pair associated with a logical slot identified by the bucket number and the slot locator; determine a physical address of the key value pair based on the slot locator; and access the key value pair using the physical address of the key value pair; wherein the determining of the physical address may include include (a) counting from a most significant bit of the slot locator the number of zero bits that equals the value of the logical address to find the corresponding logical slot; (b) determining a number of colliding keys in a logical slot as a number of one bits that follows the certain zero bit corresponding to the logical slot (Lslot); and (c) setting an identifier of a physical slot that stores the key value pair as a number of set bits that precede the certain bit.

There may be provided a system for accessing a key value pair stored in a solid state drive (SSD) memory, the system may include an SSD controller that may be configured to receive by an input value; apply a first hash function on the input value to provide a first hash result; determine, based on the first hash result, a bucket number and a slot locator; determine a logical address of the key value pair associated with a logical slot identified by the bucket number and the slot locator; determine a physical address of the key value pair based on the slot locator; and access the key value pair using the physical address of the key value pair; wherein the determining the physical address of the key value pair based on the slot locator may include applying a permutation that provides an order of a physical address of the key value pair, wherein the permutation maps different keys to different values.

The SSD controller may be configured to receive a new key that may be associated with a new colliding logical slot and recalculate the permutation to provide a new permutation that maps the new key and current keys to different values.

There may be provided a system for accessing a key value pair stored in a solid state drive (SSD) memory, the system may include an SSD controller that may be configured to receive by an input value; apply a first hash function on the input value to provide a first hash result; determine, based on the first hash result, a bucket number and a slot locator; determine a logical address of the key value pair associated with a logical slot identified by the bucket number and the slot locator; determine a physical address of the key value pair based on the slot locator; and access the key value pair using the physical address of the key value pair; wherein the determining of the physical address may include scanning a tree of keys mapped to a logical slot, wherein nodes of the tree may be indicative of indexes with the keys that differentiate between one key to another.

There may be provided a system for accessing a key value pair stored in a solid state drive (SSD) memory, the system may include an SSD controller that may be configured to receive by an input value; apply a first hash function on the input value to provide a first hash result; determine, based on the first hash result, whether the key value pair may be associated with metadata stored in a main data structure or an outcast data structure; wherein when determining that the key value pair may be associated with the main data structure then determining a bucket number and a slot locator; determine a logical address of the key value pair associated with a logical slot identified by the bucket number and the slot locator; determine a physical address of the key value pair based on the slot locator; and access the key value pair using the physical address of the key value pair.

There may be provided a method for accessing a key value pair stored in a solid state drive (SSD) memory, the method may include calculating, by a SSD memory controller and based on an input key, a first bucket identifier and a first inter-bucket value; determining a block cluster that stores the key pair value, based on the first bucket identifier, the first inter-bucket value and metadata of a data structure selected out of a first data structure and a first outcast data structure; calculating, based on the input key, a second bucket identifier and a second inter-bucket value; determining key pair value retrieval information, based on the second bucket identifier, the second inter-bucket value and metadata of a data structure selected out of a second data structure and a second outcast data structure; wherein the second data structure and the second outcast data structure are allocated to the block cluster; and retrieving at least the value of the key pair value based on the key pair value retrieval information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
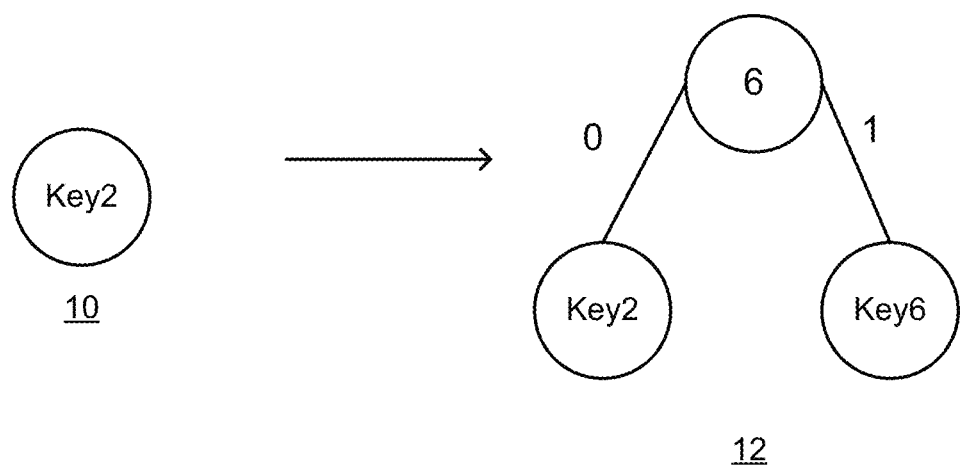
FIG. 1 is an example of a simplified insert procedure.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory non-transitory computer readable medium that stores instructions that once executed by a computer result in the execution of the method.

Any reference in the specification to a system should be applied mutatis mutandis to a method that can be executed by the system and should be applied mutatis mutandis to a non-transitory non-transitory computer readable medium that stores instructions that once executed by a computer result in the execution of the method.

Terminology
a. MD—metadata, control/system information describing system internal state. In SSD controller usually relates to address translation related information, block related data and other information for system state recovery.
b. P/E (program/Erase) cycles, Cycle Count (CC), Erase count—Number of times a block was erased (and probably re-written).
c. SLC—a non-volatile memory cell that stores a single logical bit value.
d. MLC—a non-volatile memory cell that stores a multiple logical bits value.
e. Program—writing data to flash operation (in page granularity).
f. Page—Single programmable unit of NAND FLASH memory holds user data (e.g. 16 Kbytes) and redundancy information. Pages are programmed sequentially (unless SLC mode is used).
g. First data structure—a data structure that stores information for selecting a second data structure that is associated with a block cluster. The first data structure may also be referred to as a dispersive hash table or main hash table. The first data structure may include multiple first buckets.
h. First metadata—metadata of the first data structure.
i. Second data structure—a data structure that stores retrieval information for the key value pair. The first data structure may include multiple second buckets.
j. Second metadata—metadata of the second data structure.
k. Logical slots—each bucket includes multiple logical slots (also referred to as Lslots or L-slots). A first logical slot (of the first data structure) may include one or more block cluster identifiers. The one or more block cluster identifiers may be referred to physical addresses or physical slots. A second logical slot (of the second data structure) may include retrieval information of one or more key value pairs.

l. Slot locator (also denoted SL) belongs to a bucket and is metadata used for finding a logical slot of the multiple logical slots of the bucket.

m. Collision separation vector (also denoted CSV)—metadata of a bucket that is used to solve collisions.

n. Block—Single erasable unit of NAND FLASH memory. May include of multiple physical pages.

o. Plane—flash devices are typically divided into few planes (2 or 5) allowing parallel flash access operations on all planes simultaneously. Allows parallel data access in double (or larger) granularity. Such flash architecture approach practically enlarges page size, while still providing the option to write smaller chunks of data.

p. CW—Codeword, smallest data unit processed by the Error correction code (ECC). In some examples it is assumed that the CW is of a fixed size and may include multiple key-value pairs.

q. Object—a key-value pair (or only the value of the key value pair) may be referred to as an object.

Figure 9A:
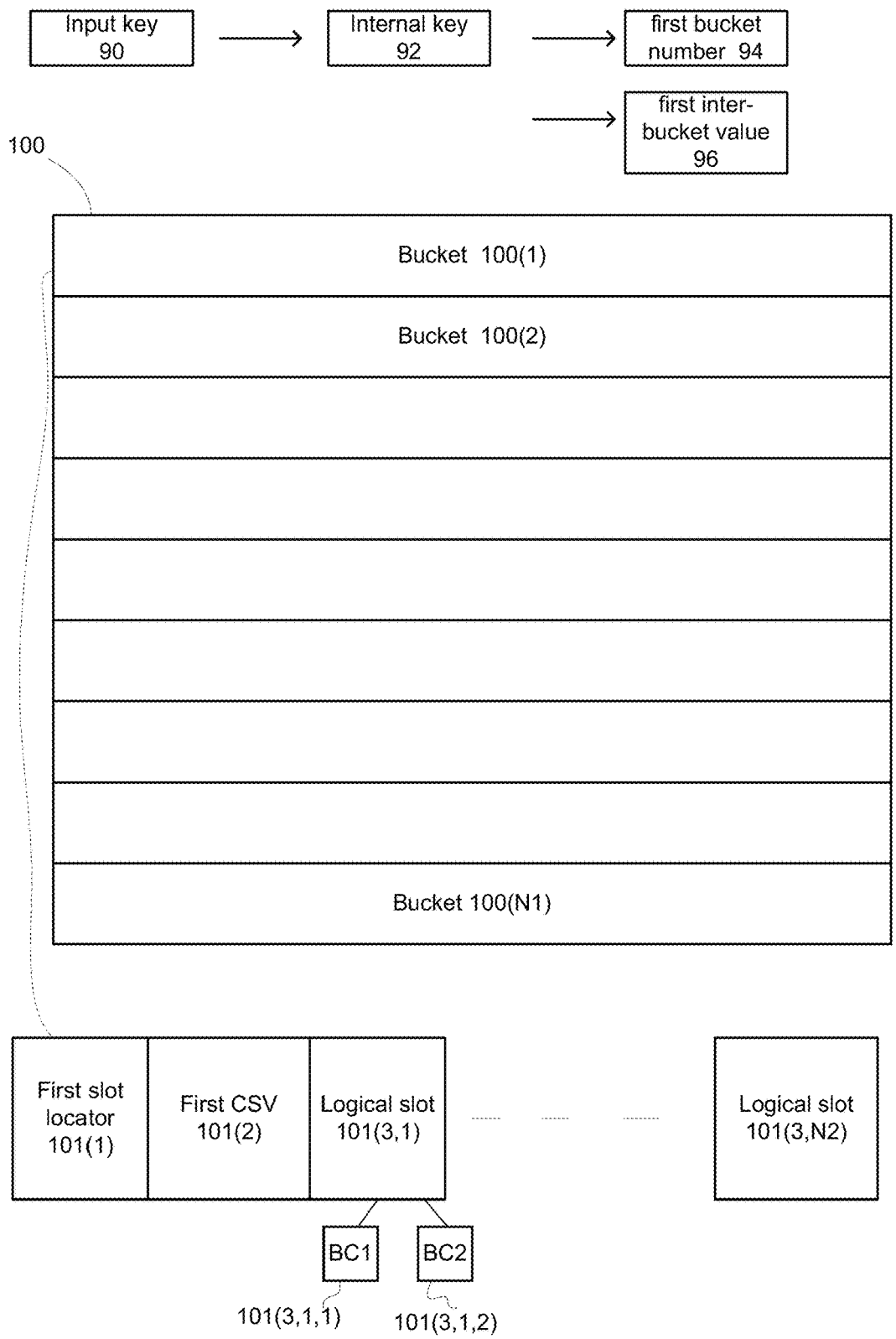
FIG. 9A is an example of a main data structure.

FIG. 9A illustrates a first data structure 100 that includes N1 first buckets 100(1)-100(N1), each first bucket includes a first slot locator, first CSV and first logical slots that store one or more block cluster identifiers.

Figure 9B:
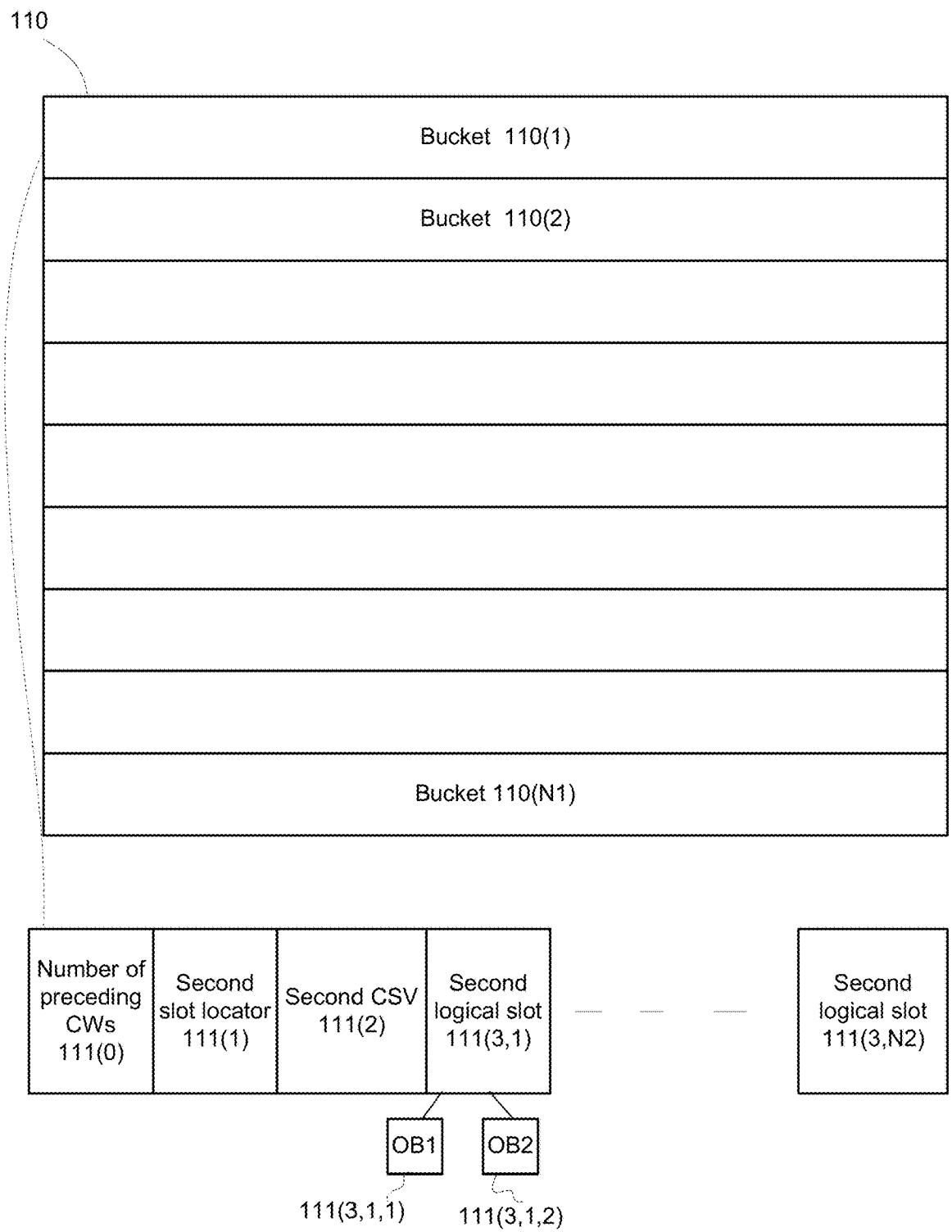
FIG. 9B is an example of a secondary data structure.

For example, first bucket 100(1) includes first slot locator 101(1), first CSV 101(2), and N2 first logical slots 101(3,1)-101(3,N2). In FIG. 9B the first logical slot 101(3,1) includes two block cluster identifiers BC1 101(3,1,1) and BC2 101(3,1,2).

FIG. 9B illustrates a second data structure 110 that includes N1 second buckets 110(1)-110(N1), each second bucket includes a second slot locator, second CSV and second logical slots that store retrieval information for one or more key value pairs.

For example, second bucket 110(1) includes second slot locator 111(1), second CSV 111(2), and N2 second logical slots 111(3,1)-111(3,N2). In FIG. 9B the second logical slot 111(3,1) includes retrieval information for two key value pairs OB1 111(3,1,1) and OB2 111(3,1,2).

Figure 9C:
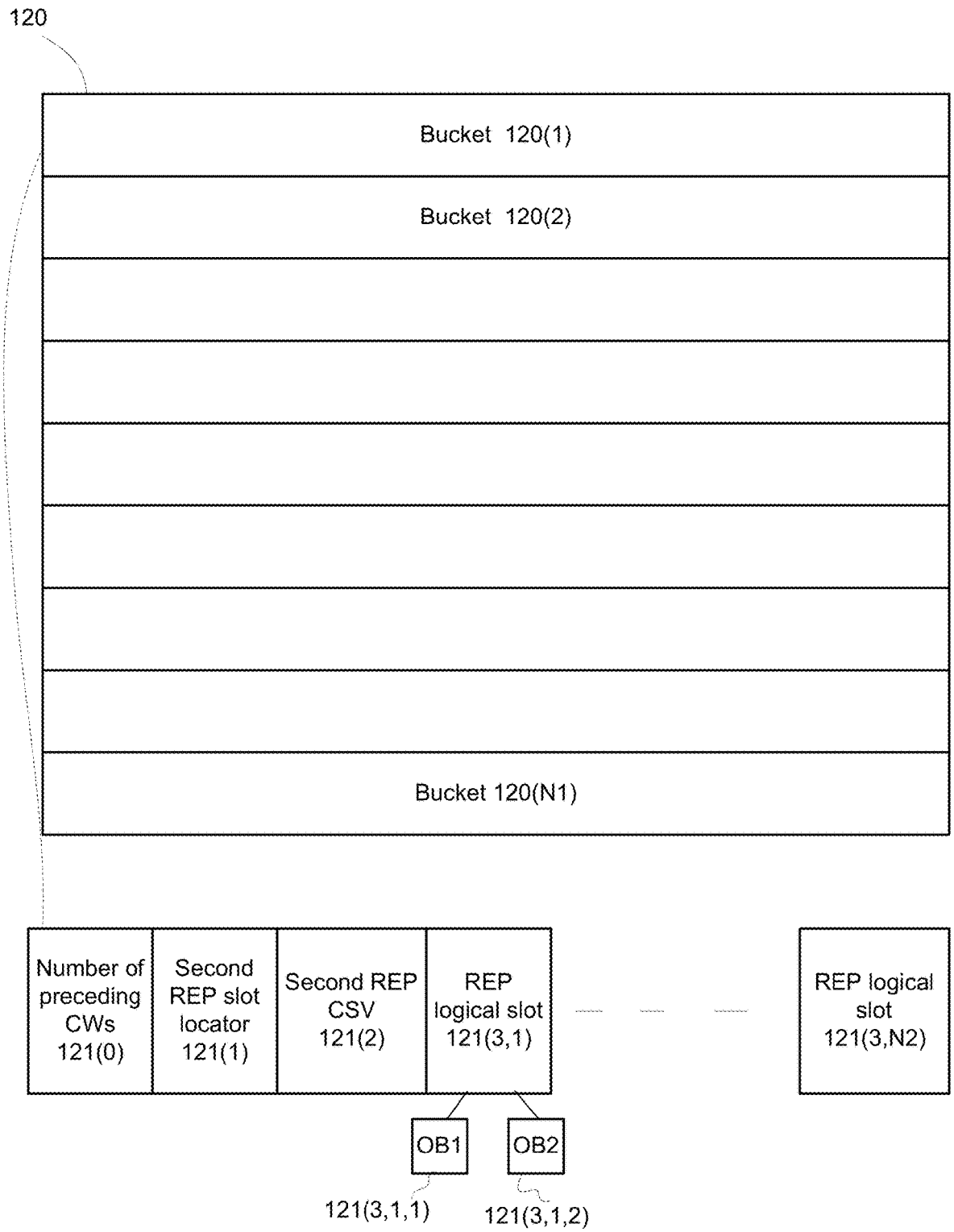
FIG. 9C is an example of a secondary data structure.

FIG. 9C illustrates a second data structure 120 that includes N1 second buckets 120(1)-120(N1), each second bucket includes a second slot locator, second CSV and second logical slots that store retrieval information for one or more representative (REP) key value pairs.

For example, second bucket 120(1) includes second representative slot locator 121(1), second representative CSV 121(2), and N2 second logical slots 121(3,1)-121(3,N2). In FIG. 9C the second logical slot 121(3,1) includes retrieval information for two representative key value pairs OB1 121(3,1,1) and OB2 121(3,1,2).

The following describes a computer program product, a memory controller and a method for managing a NAND flash storage device with a key-value interface.

Such storage device should be able to store objects that include a key and value a of arbitrary length.

Such storage device should be able to fetch the value to a Host/User according to key it was stored with.

Key value storage device should be able to map the key to the physical place it stored the data at in order to locate it when fetching the data.

The specifics of NAND flash (write once, read many, large erase unit, limited program-erase cycles) impose certain requirements and limitations on the mapping mechanism, which are taken into account at the presented solution.

The database described for managing such a storage device is an advanced variant of Hash-table called Dispersive Hash Table.

The database resides on random access memory (with faster than flash access, for example DRAM).

The database may be optimized for low memory-space footprint, thus allowing to map much more key-value pairs (objects) and enabling low latency with no additional reads from flash in order to determine object location on flash.

The basic operations for accessing key-value storage device managed with the described database:
PUT(key, value, key-size, data-size)—Write object
value=GET(key, key-size, data-size)—Read object
DELETE(key, key-size)—Remove object
Key-Value Based Database
Block-Clusters
Disk span is divided into block-clusters.
Block cluster can include of multiple blocks, on multiple NAND dies.
For example, for each instance of database, 1000 block-clusters exist, each cluster is 2 GB and includes 512 NAND blocks.
Such configuration results in 10 bit block-cluster indices in a main mapping table.
Data in each block-cluster is sorted by key in a certain manner described later.
Translation Levels
The first translation level is the first data structure (such as a Main hash table) which maps Key to a second data structure (such as a block-cluster index).
Block-cluster can point to either immutable TLC data or currently being populated SLC-buffer.
Main hash table may include of 2 regions, the $2^{nd}$-region being used to resolve overflows or conflicts from the first region.
A second translation level maps Key to a physical location within block-cluster
System Key (also referred to as ikey or intermediate key).
User-key (also referred to as input key), which is of arbitrary length is reduced to a system-key (aka key) which is a fingerprint/hash of the user-key. For example, key can be configured to 128-bit length.
Main Key Value Database
Main Hash data structure may include of 2 Regions
 a. Region-1: Dispersive Hash Table
   i. Input: Hash(key) from which stems Hash-Bucket+Logical-Slot #
   ii. Output-1: Flag indicating whether need to check in Region-2
   iii. Output-2: Block-cluster index
   iv. It may use extensions to extend the size of a bucket
 b. Region-2:May be implemented using Outcasts Table
   i. Input: Hash(key) 4 Hash-Bucket+Logical-Slot # (in Outcasts table)
   ii. Output-1: Key was found or not. If not, use value from region-1.
   iii. Output-2: Block-cluster index if key was found
Dispersive Hash-Table Details
Divided into buckets, which are managed with a supporting metadata.
Each key is being mapped to a hush-bucket index and a logical slot index by some hash function.
Hash-bucket metadata translates Logical-Slot within a hash-bucket into a Physical-Slot number while also resolving collisions.

Each Physical-Slot holds block-cluster Index of for example 10 bits (for 1K clusters).

Slots Arrangement

Physical slots are being occupied with objects according to arrival order and relative logical order among existing slots. Which means that insertion operation pushes following slots (memory move operations required).

Hash-Bucket Metadata

Every bucket in the MDH is divided into serval segments: Slot locator, Collision separation vector, and Physical slots (Pslots). An example for the segmentation encoding can be found in שגיאה! מקור ההפניה לא נמצא. 10.

Slot Locator

Encodes a physical slot number (location in hash-bucket) not including collisions distinction, and the amount of collisions in a slot. i.e.

If no collisions in a logical slot—provides the physical slot number.

If 't' colliding objects in a slot—provides range of 't' slots, one of them holding the object with the queried Key.

Slot-locator encoding described below is an example, the actual compression scheme may be different.

Slot-locator can be a Zero-separated bit-sequence (sort of run-length code) representing number of colliding slots by number of '1's per logical slot.

Figure 10:
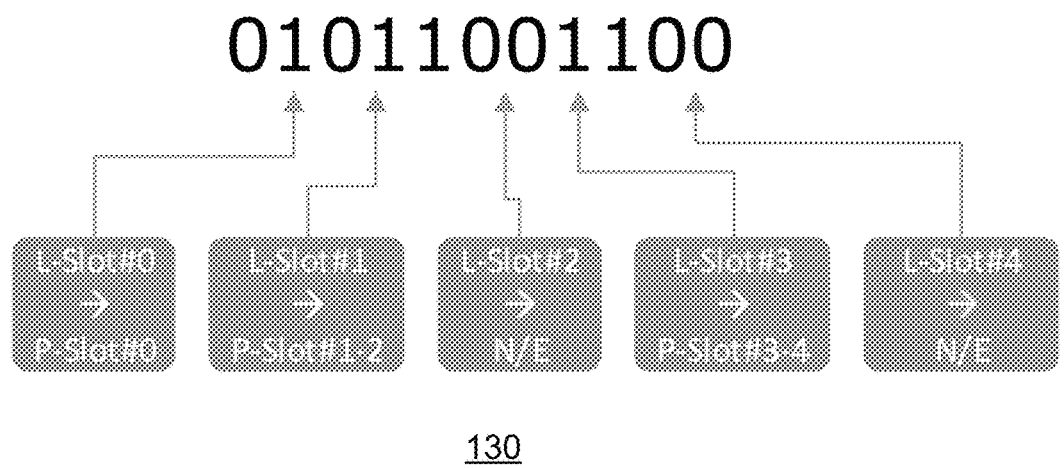
FIG. 10 is an example of sequence of bits.
Figure 11:
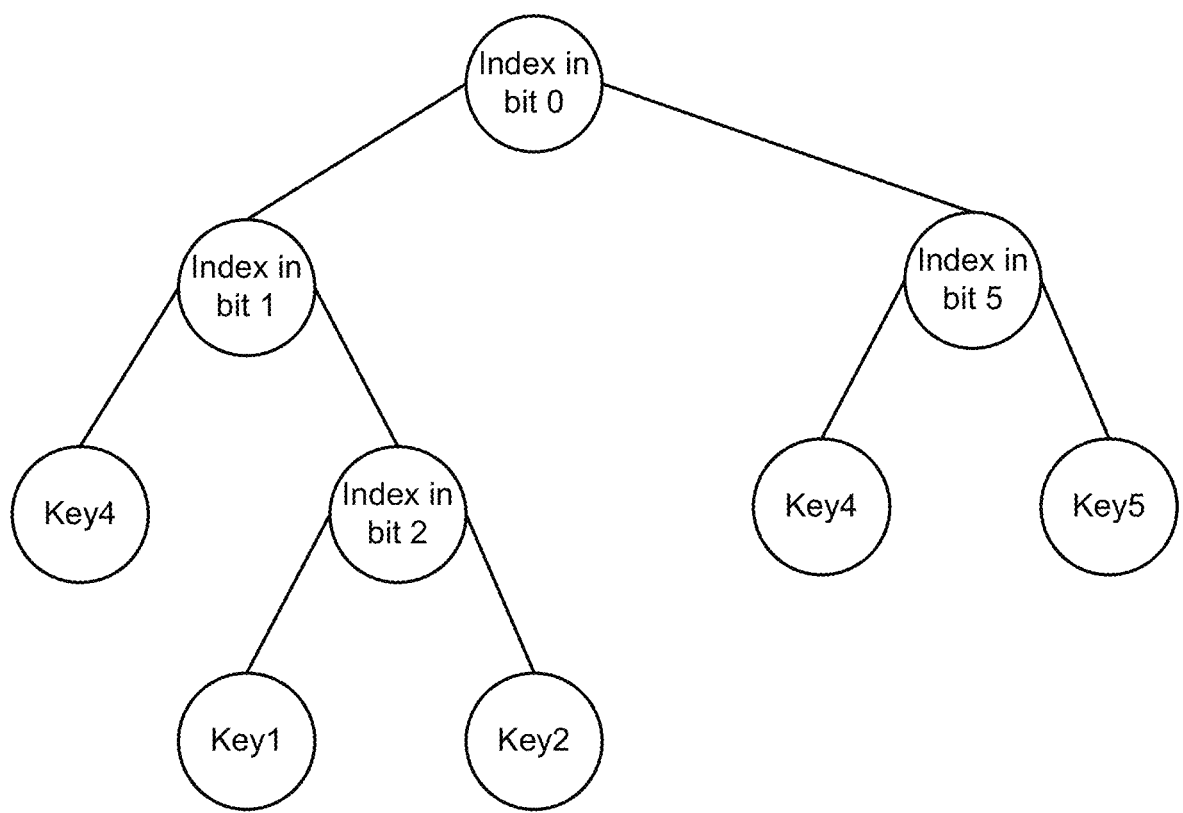
FIG. 11 is an example of a tree.
Figure 12:
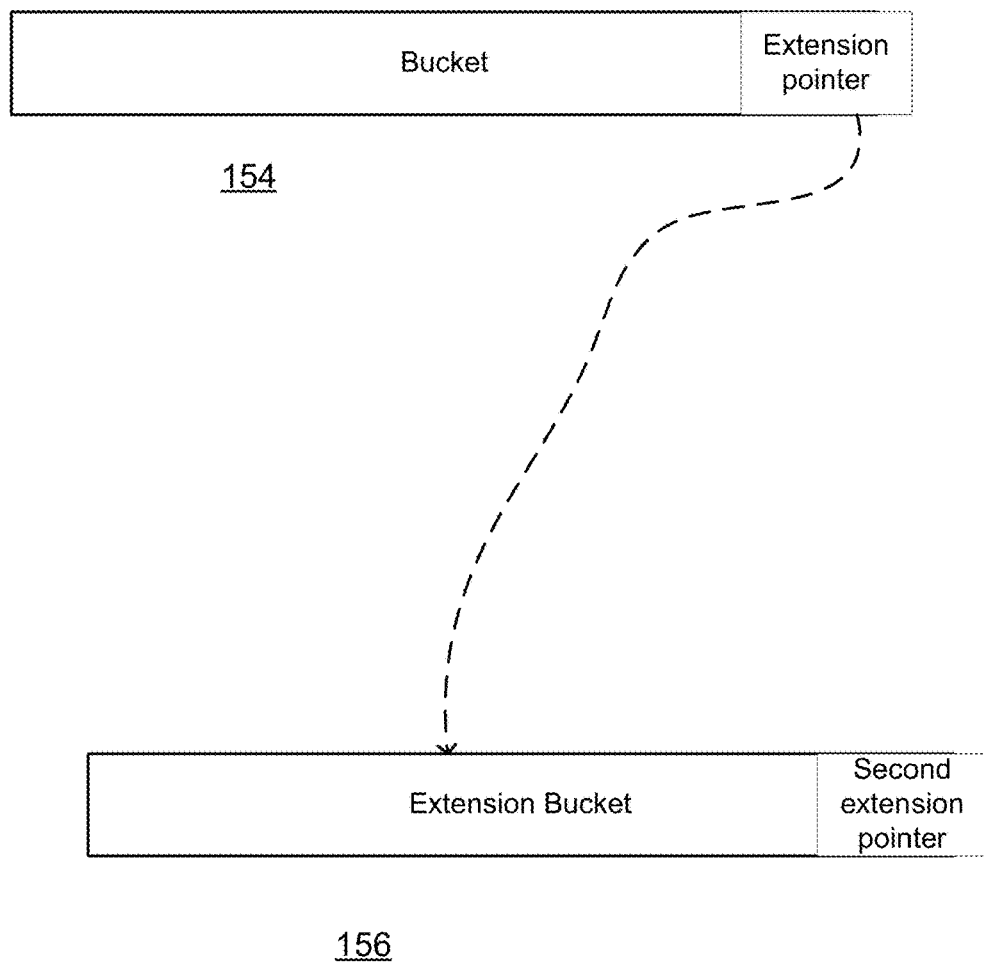
FIG. 12 is an example of an extension.

Consider '01011001100' bit-sequence (denoted 130 in FIG. 10). In order to find a physical-slot (P-Slot) corresponding to the logical-slot (L-Slot) #3 (4th slot), need to count equivalent amount of 5 zeros, the following '1's sequence tells how many objects colliding per this L-Slot (two '1's means 2 objects), the preceding '1's amount from the beginning of bit-sequence tells the physical slot number (three '1's means 3rd P-Slot).

For this coding, inserting a new object requires pushing '1' bit between already existing bits, i.e. performing memory move to make space for this bit.

Allocated space in this example is 2 bits per object (slot), e.g. 64 Bytes per hash-bucket (for 256 slots in a hash-bucket), which can be expanded into up to 3 bits (for virtual expansion of ×2 slots), thus resulting in a lower collision rate.

Virtual Expansion

There's an option to virtually allocate L-slots so that the number of L-slot is different than the number of P-slots. We may expand or shrink the slot locator to hold more (e.g. 2× more) or less slots, respectively. By such approach, we can reduce the number (probability) of collisions per L-slot or reduce the number of bits in the slot locator. It may as well reduce the required length of collisions-separation vector at the cost of a larger slot-locator vector.

Virtual expansion with ratio of 2, in this terminology, means twice the L-slots than P-slots, e.g. 512 vs. 256.

Collisions Separation Vector

In case of collisions per L-Slot, separation vector facilitates establishing the exact physical slot per key (offset in P-Slots range). There are two possible implementations:

Permutation Implementation

Per L-Slot having a collision, separation vector holds an index (possibly compressed) to a permutation of hash parameters providing a perfect Hash-Function for all the Keys in the range. During data insertion, a process to find such permutation is being performed.

Generated permutation also dictates the internal order of objects placed in P-slots range. I.e. adding a new object may reorder the other objects in L-slot.

It should be noted, that the compression scheme may use a different representation of index per every number of colliding objects in slot (t).

Number of collisions (t) handled with a perfect hash function may have an upper boundary, e.g. 6 objects per slot in region-1. Excessive colliding slots will be treated as outcasts.

The process of generating perfect hash function may fail to find a satisfactory permutation, also causing one of the objects to be relocated to outcasts table.

Seperation Tree (ST) Implementation

Per L-Slot having a collision, separation vector holds a separation Tree (ST) (possibly compressed) which holds the needed to separate the keys in the L-slot.

The method of solving collisions between a list of keys using minimal number of bits, uses operations of "insert", "remove" and "find". The tree method cut the set of keys each time into two groups depending on the value of a bit in a chosen index. The decision tree consists of "inner nodes" and "leaves".

One might implement the above operations such that the keys will be ordered according to their value from left to right.

Example of a Decision-Tree

There are many ways to build a tree that separates these keys, since keys can be inserted and removed from the tree by any order. One might implement the tree so that the keys will be ordered according to their value from left to right, as in שגיאה! מקור ההפניה לא נמצא. (tree denoted 150) for the following keys:

key$_1$=0100111
key$_2$=0110010
key$_3$=1011001
key$_4$=0010010
key$_5$=1011010

Here we show how we can easily insert, delete and find an object in the list. We describe here the general algorithms.

Find

To find an object, we follow the index-nodes until we reach a leaf, where in each node and continue according to the bits of the keys. Using the example depicted in שגיאה! מקור ההפניה לא נמצא., if we wish to find key$_3$=1011001, we do the following:

a. First node is index 0. The bit in index 0 is 1, hence we turn right
b. The second node is the right son and represents index 5. The bit in index 5 is 0, hence we turn left.
c. We reached a leaf, and the leaves order is 5 based on the tree structure The 5$^{th}$ location in the order is, clearly, key$_3$.

Simplified Insert

There are multiple ways to implement insert. One way to implement it is to use a simplified insert, a simple insert algorithm. By using such algorithm, we cannot ensure that the keys in the tree will be sorted.

To insert an object, we first have to get to a leaf just as described in "find" (such operation is called "fetch key"). Then, let us use the example in ההפניה לא נמצא. שגיאה! מקור to insert a new key—key$_6$=0110011. The "find" algorithm will lead us to key$_2$. Then a. Fetch the key that currently resides in that leaf—got key$_2$=0110010
b. Find an index that differ between that key and the inserted key—this is index 6
c. Transform the leaf into a node representing the index from 2.
d. Place the two keys according to the bit in the found index The leaf key$_2$ (10 in FIG. 1) is now replaced (as illustrated by nodes 12 of FIG. 1), as described in מקור ההפניה לא נמצא.שגיאה.

Figure 2:
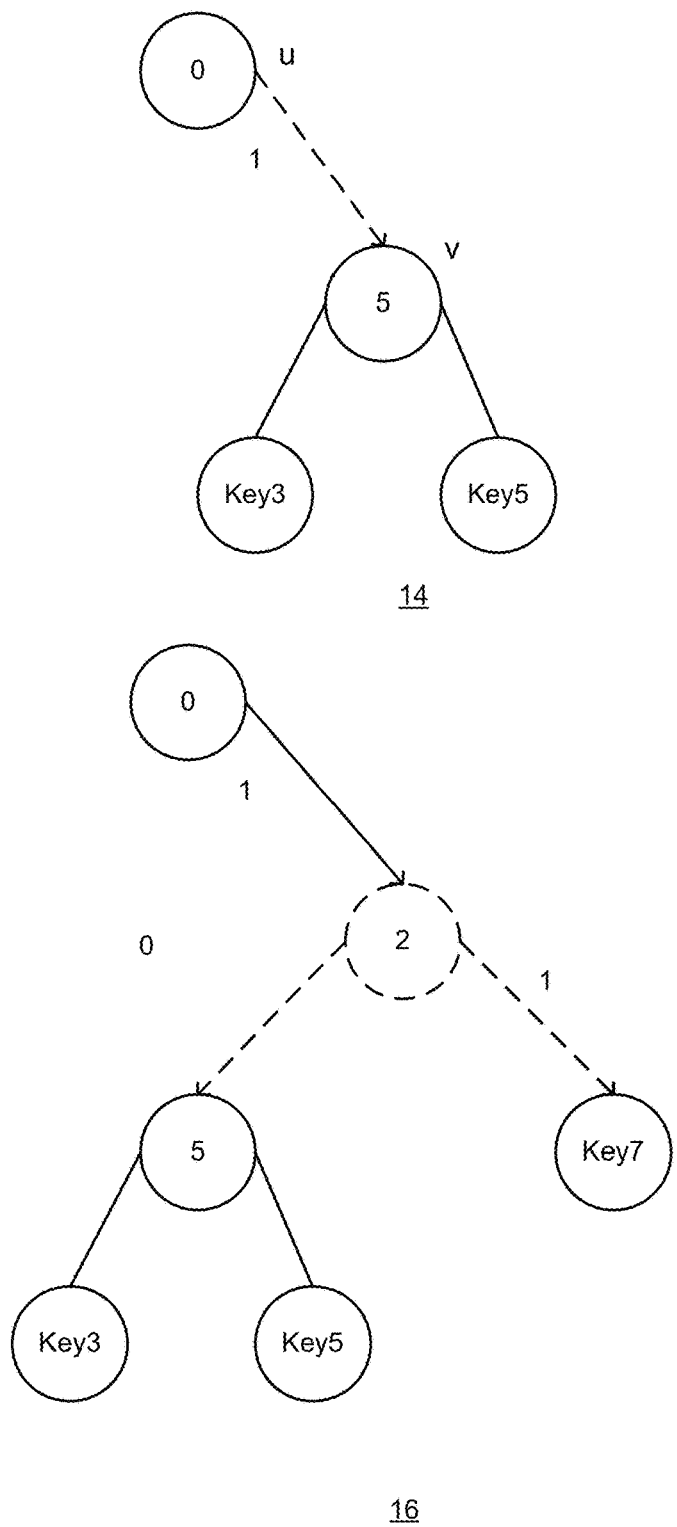
FIG. 2 is an example of a sorted insert procedure.
Figure 3:
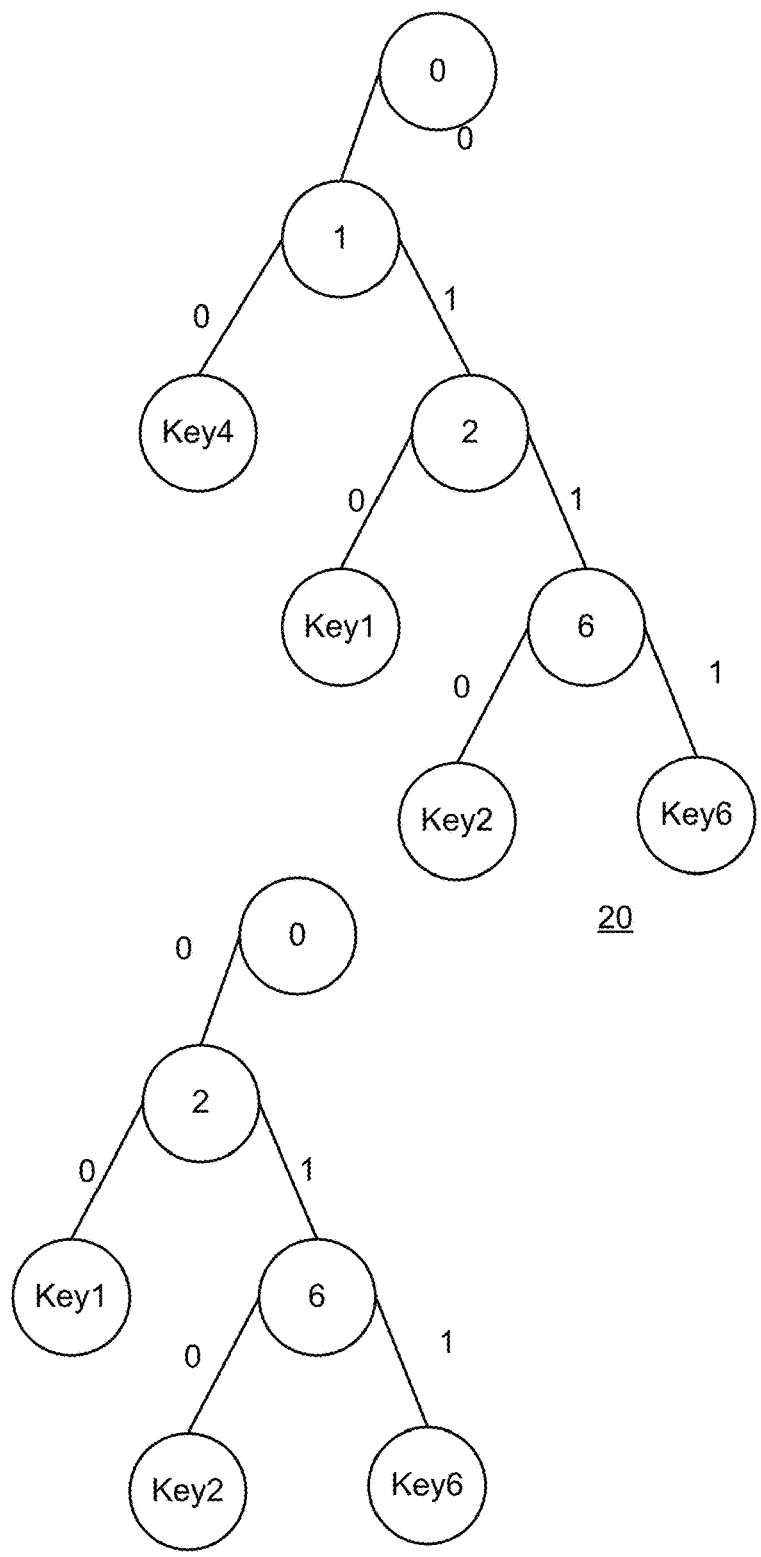
FIG. 3 is an example of a delete procedure.

Sorted Insert:

We can enforce the tree to keep the keys in order by their value by changing the insert procedure and using a slightly more complicated procedure. Suppose we insert key$_7$=1001000.

a. Similar to the simplified insert procedure, it finds the corresponding key. Suppose in our case, the fetch ikey is key$_3$=1011001.
b. Instead of replacing the leaf by the corresponding keys (as done in the simplified insert procedure) the algorithm finds the first index where the fetch key (key3) and the inserted key (key6) are different. Denote this index by n. In our example, it is n=2 (in Key 3 is 0, and in Key 7 it is 1).
c. Then, go to the edge corresponding to those n bits. Such edge connects the first node with index larger than n (denoted by V, and included in nodes 14 of שגיאה!. מקור ההפניה לא נמצא and the last node with index smaller than n (denoted U).
d. Replace the edge with a node with index n, and split the edge into 2 subtrees to provide nodes 16 of FIG. 2. One subtree is the previous subtree, and the other is a leaf of the key. This is done according to the inserted key: For example, key 7 in index 2 equals to 1 and therefore it should be in the right side, while the existing subtree (of key 3 and 5) should be in the left side.

Note: There might be a case where a corresponding edge does not exists, i.e., the index of every node in the path between the root and the leaf of fetched key are smaller than n (That means node V as in מקור ההפניה לא נמצא. שגיאה does not exists). In such case→the insertion algorithm is similar to the simplified insertion.

By using sorted insertion, we ensure that the tree is sorted. In addition, we observe that a node of index N exists in a tree if and only if there exists two keys in the tree that are differ by the N bit, and equal to each in the first N—1 bits. Also, the node is corresponding to the common prefix (of N—1 bits). Thus, the tree is uniquely defined, based on the values of the keys and not by the key's arrival order.

Delete

For deletion we first the leaf representing that key. The "find" algorithm led us to the first object. Then
  i. Verify that the key stored in that leaf corresponds to the requested key to delete. This is done by reading from Flash. If it does not exists—return that the key does not exists.
  ii. Delete the leaf representing the key and the leaf's father. Connect the grandparent of the leaf with the leaf's sibling.

The deletion process for key$_4$=0010010 is depicted in ההפניה לא נמצא. שגיאה מקור (nodes 20 before deletion and nodes 22 after deletion).

Bucket Encoding and Extensions

We may set the size of every bucket by three ways: dynamic buckets, which may have dynamic or static segmentation, and static buckets.

Dynamic Buckets

In dynamic buckets the size of every bucket is changed dynamically. That means, if the bucket is "full" (an exact definition will be given later), we link an extension to the bucket increase the size of bucket. Every bucket begins with a base that contain a pointer to next extension, and every extension is selected from a pool of free chunks (implementation is done via "free lists").

All extensions have equal size and the size an extension is shorter than that of a base. The size of every segment is dynamically changed.

An example for dynamic buckets is shown in ההפניה לא נמצא. שגיאה מקור. A bucket 154 may include an extension pointer that points to an extension bucket 156 that may or may not have a second extension pointer for pointing to yet another extension bucket. The bucker 156 may belong to any one of the first data structure or the second data structure. There may be any number of extension packets.

Dynamic Segmentation with Successive Lslots

Figure 6:
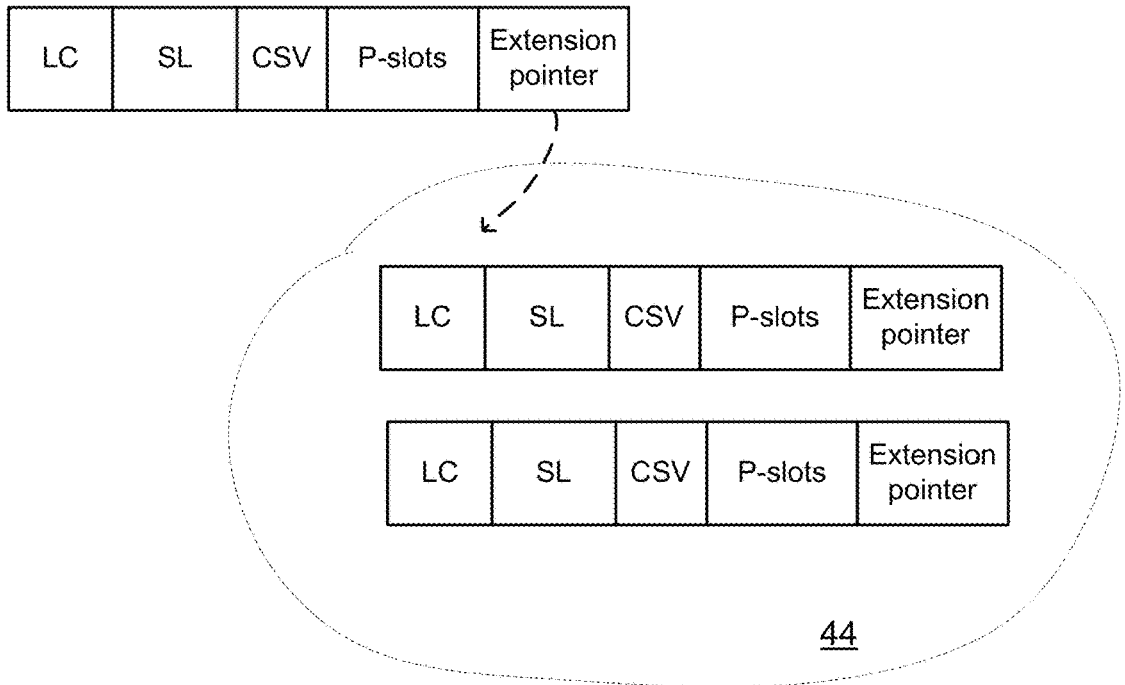
FIG. 6 is an example of static segmentation in dynamic buckets.
Figure 6:
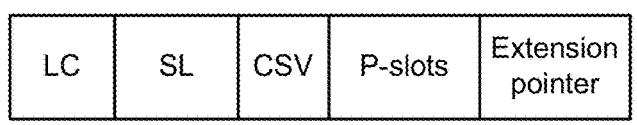

One may implement the buckets to be composed of successive Lslots, as in שגיאה מקור ההפניה לא נמצא.. or FIG. 6.

Figure 4:
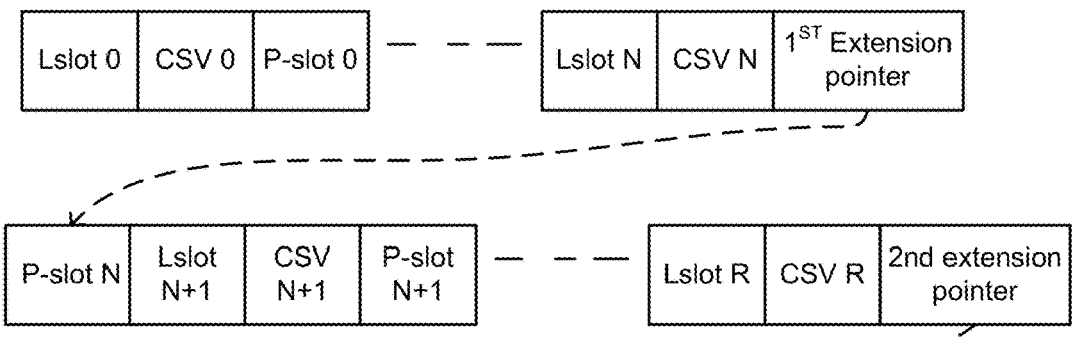
FIG. 4 is an example of dynamic segmentation with successive logical slots.

In FIG. 4 there is a bucket 32 that includes N−1 repetitions of (logical slot, CSV field and P-slot) followed by an N'th logical slot, the Nth CSV and a first extension pointer that points to an extension bucket 34 that includes P-slot N followed by (R−N−2) repetitions of (logical slot, CSV field and P-slot), that may be followed by the R'th logical slot, the R'th CSV and a second extension pointer that points to a yet another extension bucket (not shown).

Each repetition of (logical slot, CSV field and P-slot) may belong to a logical slot.

Figure 5:
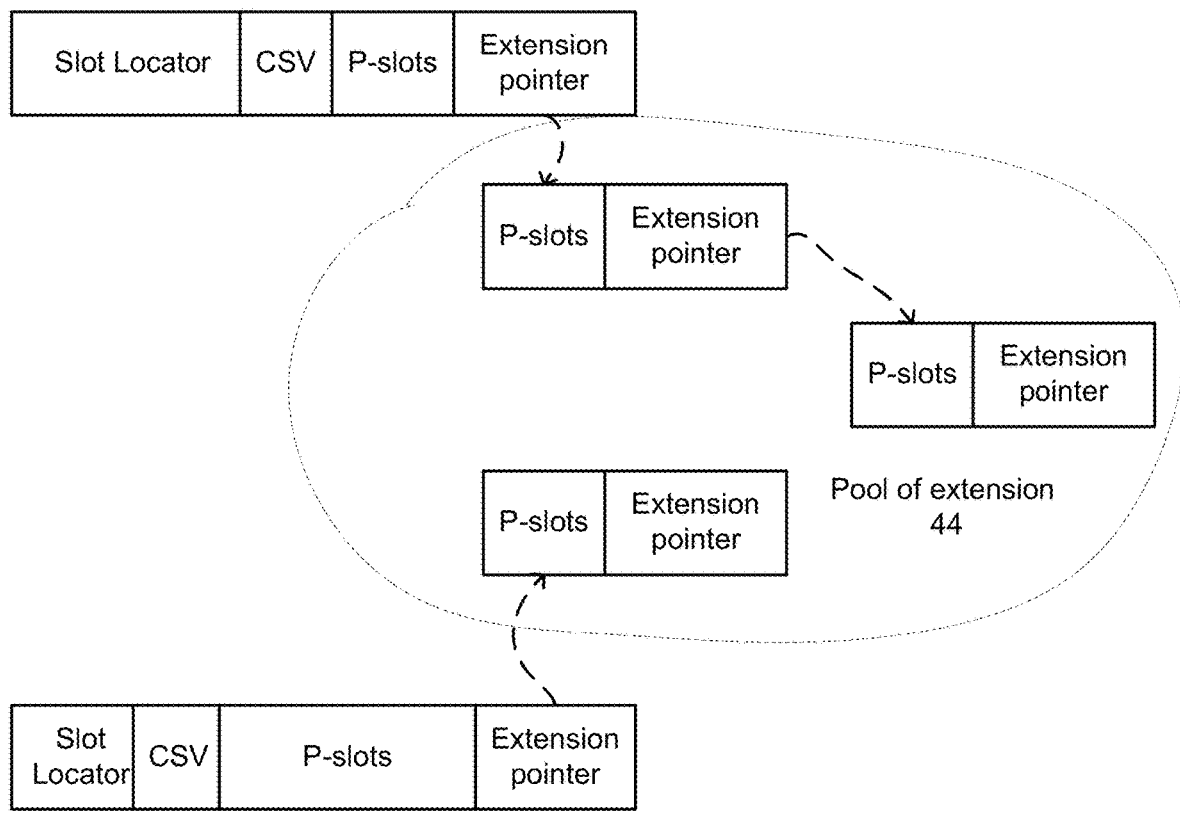
FIG. 5 is an example of dynamic segmentation with accumulated segmentation.

FIGS. 5 and 6 illustrates buckets 40 and 42 that point to a pool of extensions 44. The fields within the buckets and the extension buckets may be of fixed length (FIG. 6) or a variable length (FIG. 6). Extension pointers point to extension buckets.

In Static segmentation the sizes of every segment (SL, CSV,Pslots) is constant for every base and extension. In case of an overflow in one of the segments, the corresponding Lslot is moved to the next extension. Every entry (base or extension) will hold a field called a Logical Counter (LC) that counts the number of LSlots in an entry. This is depicted in FIG. 6.

Note: extensions might be implemented with outcasts.

Static Buckets

We may implement buckets to have constant size, without no extensions. In such case, if an insertion of a key will result in a corresponding overflow (i.e., the size of a bucket of segment is larger than a given threshold), we move the corresponding key to an outcast table.

It should be noted that when a content-size metadata segment is full, then when inserting a new key to the bucket we add the key to the outcast table.

An outcast may not be used when using a tree CSV and bucket segmentation is dynamic (with extensions).

Outcasts Table

Following the above, some unresolved cases may occur, such as for example:
  a. No perfect hash permutation was found for input keys (when using permutation implementation)
  b. Too many collisions per slot (t overflow).
  c. Overflow in one of segments, and the corresponding key does not move to an extension
  d. Collisions separation vector space overflow (in permutation implementation)

P-Slots Space Overflow

In such cases data will be stored in the outcast table, and a counter of objects in outcast table region per hash-bucket is updated in metadata.

The outcasts table absorbs records which failed to fit in the main dispersive hash-table.

Unlike main hash-table, outcasts database may also hold the "key" per object (or some compressed version of it) to eliminate (or reduce) the probability of misdetections in this table.

The outcasts table is expected to hold a significantly lower number of objects than main dispersive hash table. E.g. 0.1% of all objects.

Whenever space is freed in the main hash table, for example upon object deletion, an attempt should be made to reinstate objects (relocate objects from region-2 back to region-1).

Outcasts table may be structured as some hash-table for example. It may hold pairs of key and corresponding block-cluster index.

To alleviate reinstating objects from region-2 (outcast tale) to region-1 (MDH), the key used to access outcasts table (called secondary-key, aka sKey) may be derivative of the physical location (L-slot) in region-1 dispersive hash table.

For such hashing, all objects mapped to the same dispersive-hash-bucket may be clustered in outcasts table. Therefore, finding a key to reinstate will require scanning a few adjacent cells in Outcasts table, and will not require a random scan in memory.

Block Cluster Mapping

Objects within a block-cluster are ordered according to the key and their location (index) is mapped and resolved using dispersive hash metadata structure. I.e., the $k^{th}$ largest key in the cluster appears before the $k+1^{th}$ largest key.

All objects linked to a hash-bucket N will be stored on flash "before" objects of N+1 bucket. And objects mapped to the same bucket are ordered on flash according to physical-slots order of that bucket.

One might implement the block-cluster mapping in the following methods:
a. Full map order—where all objects are saved in the block-cluster, and to find the physical location of an object, we use its ordinal number (sequential index).
b. Representation method—where we save a subset of objects in the cluster map, called representative. Given a key of an object, our goal is to find its corresponding representative.

Full Map Ordering

To find the physical location of an object, it's ordinal number (sequential index) in a block-cluster is required as an input to CW-starts-map (described below), which encodes the actual location.

The cluster map is a dispersive hash-table representing objects order information, is similar to the MDH 4 per bucket it requires a slot locator, a collision separation vector and in addition a CW start map are needed.

In the same manner as in the Metadata with the Main dispersive hash-table, we yield the sequential number of the object in a hash-bucket. Adding all slots in the preceding buckets (hash_bucket index*slots_per_bucket) will produce the absolute index of the object inside the block-cluster.

Hash Key to Block-Cluster

The key used to access block-cluster may be sKey, same as for the Outcasts table.

This allows finding all objects mapped (colliding) to the same L-slot in main hash-table without knowing their actual keys, since the sKey is defined just by the L-slot location in the main hash. This way the Keys required for creating a new hash permutation (e.g. following Put transaction resulting in object collision on main hash) can be found and read from flash by checking per P-slot in main hash range the relevant block-cluster index and finding the relevant address in flash in a block-cluster mapping.

By design, collisions separation vector in block-cluster's metadata can be made to always resolve the collision per used sKey (with no $2^{nd}$ region mapping in block-cluster).

CW-Starts-Map

After determining the ordinal number of the object, an additional mapping vector may be used to find the actual object start location (ordinal codeword number) in a block-cluster.

This CW-Starts-Map describes the number of objects starting per ECC-CW and provides the index of ECC CW to start reading the object from. It also provides the length of the object in CWs, so read process can prepare for reading the required CWs.

CW-Starts-Map vector is maintained per each block cluster.

Coding Method

The coding method of the CW start map might be unary or binary.

Unary Encoding

The data in CW-Starts-Map can be for example coded/compressed with run-length code—with sequences of '1's coding the number of objects starting in a CW and CWs separated with zeros. i.e. per CW the possible values are
  i. 0=0 objects in CW
  ii. 01=1 object in CW
  iii. 011=2 objects begin in CW
  iv. 0111=3 objects begin in CW etc.

The processing steps of CW-Starts-Map:
  i.-->count number of '0's=ECC CW number
  ii.-->count number of '1's=Object number E.g. for data-bits: 0100110100111, there're 3 objects which begin in the $6^{th}$ CW (CW #5) the objects' sequential numbers are 5,5 and 6.

CW-starts-map can be split into segments allowing easier access and parsing.

CW-starts-map may employ additional compression for special cases, for example for large objects.

Binary Encoding

An alternative for the unary encoding is the binary encoding.

For every CW we limit the number of objects in the CW. For example, we can limit the number of objects per CW to $n=2^k$ objects (for example, n=8).

The CW-start map will then allocate k bits per CW, to denote the number of objects per CW.

Combining CW start with block-cluster map

We may encode the CW start map inside the block cluster map.

This can be done, for example, by adding two segments:

For every bucket we encode the ordinal number of the object with the largest key in the previous bucket. In other words, that means the number of CWs the previous buckets. We called it's the Previous CW count (PCC)

We encode the ordinal number of every object in the current bucket, relative to the PCC. That means, we encode for every object o with ordinal number $n_o$ and with its bucket PCC PC $C_o$ the number $n_o-PCC_o$. The encoding is done using the CW-start map encoding.

Representative Method Ordering

The representative method ordering is similar to the full order method, but instead of encoding all objects—we encode only representatives from each CW. One may encode only the last object from each CW, or the first object in a CW.

The bucket structure is similar to one in the full order method. The slot locator counts the number of representatives in a L-slot, the CSV (collision separation tree) which is implemented by a separation tree with the prefix encoded (described below). Finally, the CW start is encodes the representative start location.

Goal of Representative Method

The goal of the separation tree is that for every given obj of a given ikey to decide which is the corresponding representative. For example, if the representative is the last object in CW, for a given object of key k our goal is to find a representative with minimal key $k_r$ that is larger than (or equal to) the key of the given object, i.e., $$k_r = \min_{r'|k_{r'} \geq k} k_{r'}.$$

Note that two binary strings are satisfying $k_1 \geq k_2$ if and only if there is an index m such that the m-prefix (the first m bits) of $k_1$ is larger than the m-prefix of $k_2$. We encode for every representative the minimal prefix of its key that can be used to distinguish the representative from all other objects in the cluster. Formally, we encode a m-prefix of minimal m, used to distinguish the first object larger than the representative, and the last object smaller than representative For example, suppose the ikey of the representative is $k_r=1010$, while other objects in the cluster are $k_1=0000$, $k_2=1000$, $k_3=1100$, $k_4=1110$. Then encoding the 3-bits of the representative 101 is sufficient to distinguish the representative from all other objects. Of course, if we distinguish the representative from first object larger than the representative (i.e., $k_3=1100$) and the last object smaller than representative ($k_2=1000$) then we distinguish the representative from all other objects in the cluster.

In GET\Fetch iKey the prefix of the representative is driven by the Lslot (i.e., if there ae $2^k$ Lslots, then k bits from the prefix is driven). In addition, we may encode other bits in the separation tree, and thus yield a sufficient to distinguish the representative from all other objects in the cluster.

Separation Tree with the Prefix Encoded.

The separation tree encodes many bits from the prefix representative bits, but not all of bits. It uses to distinguish the representative from other representatives, but it may not be sufficient distinguish the representative from non-representative objects.

In every inner node in the separation tree we encode the common prefix corresponding to its right and left subtrees. This is similar to the well-known binary trie. For example, in a tree with two keys, $key_1=1010$ and $key_2=1001$ the root hold the common prefix of these keys, which is the string 10. A more complex example is the prefix tree of the below keys, depicted in שגיאה מקור שגיאה. (tree denoted 50).

key$_1$=0111111
key$_2$=0110010
key$_3$=1011001
key$_4$=0010010
key$_5$=1011010

For example, the common prefix of keys 1 to 5 have an empty common prefix. The left subtree, which has keys 1,2 and 5 have a common prefix of 0 and so on.

We may save in every node we may save the relative common prefix, as depicted in מקור ההפניה לא נמצא. שגיאה (tree denoted 52). That means, for every node we save the common prefix excluding bits that are driven the parents of the node.

Extended Prefix

While the separation tree is sufficient to distinguish the representative from other representatives, but it may not be sufficient distinguish the representative from non-representative objects. Thus, we may encode additional bits in every leaf.

Operations

Put

We create the block cluster mapping in GC\folding.

We first insert all object into a Local Dispersive Hash (LDH) which is similarly implemented as the main dispersive hash, where the CSV is implemented via a separation tree where the prefix is encoded.

From the hash we derive the minimal prefix needed for every representative to distinguish itself from every other object.

Second, we insert only representatives to the block-cluster map (similar to the MDH) and we may use extended prefix for other objects.

GET

GET is implemented similarly to the MDH. However, we may encoder two edge cases which does not happens in a regular GET:

The Lslot is empty, i.e., if there are $2^k$ Lslots, then there is no representative that begins with the first k bits of the object. There are multiple solutions for this problem. For example, if the representative is the last object in a CW, then the algorithm exams new Lslots until it finds the first non-empty Lslot. The first representative of the Lslot is the position of the first representative that is larger the object, and it represents the corresponding CW.

Figure 7:
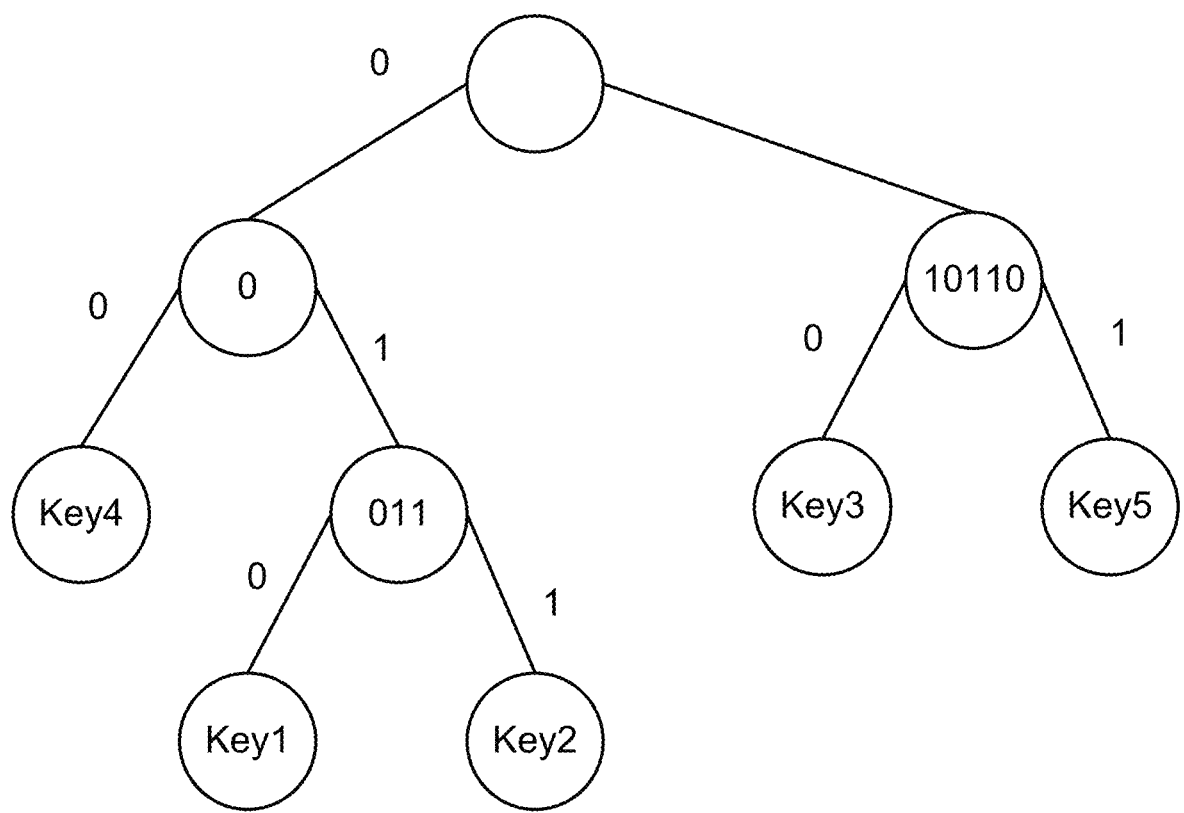
FIG. 7 is an example of a separation tree with prefix encoded in every node.
Figure 8:
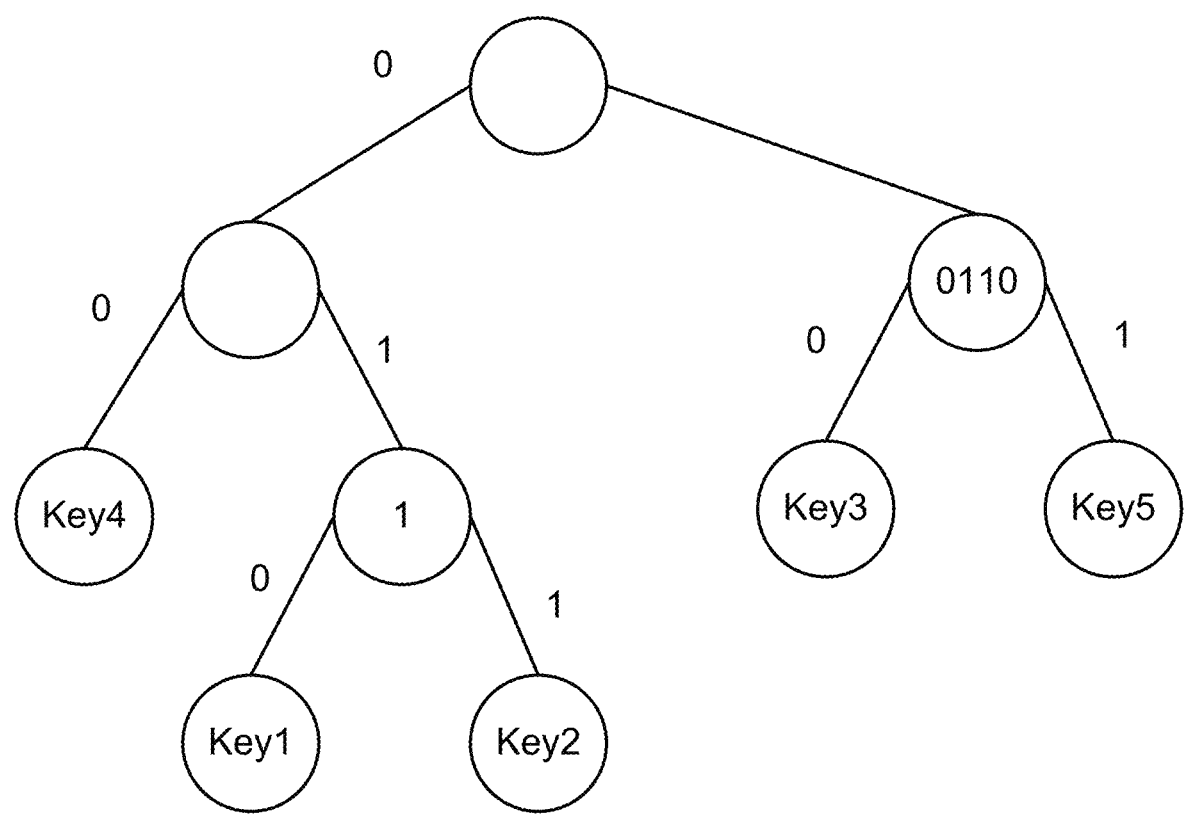
FIG. 8 is an example of a separation tree with relative prefix encoded

When finding the corresponding representative in the tree, there might be 3 options:

a. The prefix of object equals to the prefix in the corresponding node. In such case, we continue to search the object inside corresponding subtree.
b. The object prefix is larger than the prefix in the corresponding node. In such case, the corresponding representative is the first one that is larger than the last representative in the subtree.
c. The object prefix is smaller than the prefix in the corresponding node. In such case, the corresponding representative is the last one that is smaller than the first representative in the subtree.
d. For example, let us take the CSV tree depicted in FIG. 7.
e. Suppose the ikey of the object is 10010. Then, when search the corresponding representative, we are traveling right (as the first bit begins with a 1). The prefix of the node is 10110, i.e., the prefix of the object is smaller than that of the node. Thus, the corresponding representative is the last one that is smaller than the first representative in the subtree (the one with key3), i.e., this is the representative with key2.

Fetch ikey

This operation is similar to GET. We assume that by the first sKey bits we can derive the object position in the cluster.

Decreasing the Block Cluster Map

One may decrease further the block cluster map by using the following optimizations:

a. Choose a representative for every X CW, where X is a power of 2.
b. Do not encode an extended prefix for some scenarios.

Using these methods degrades slightly the read performance of the GET and Fecth iKey operations (since it read successive CWs), but duplicates the bandwidth between the DRAM and the NAND. Note that if we do not encode an extended prefix we might read two successive CWs, similar to choosing a representative for every 2 CWs.

Dispersive Hash metadata allows merging several instances. For example, for garbage collection Block-cluster MD of several block clusters may be merged.

Additional database may be used for mapping transient data, for example data may be first inserted in SLC blocks with no ordering according to key and then moved to TLC blocks while constructing the block-cluster metadata. Such SLC buffer may also use dispersive hash data structure to map the data.

Figure 13:
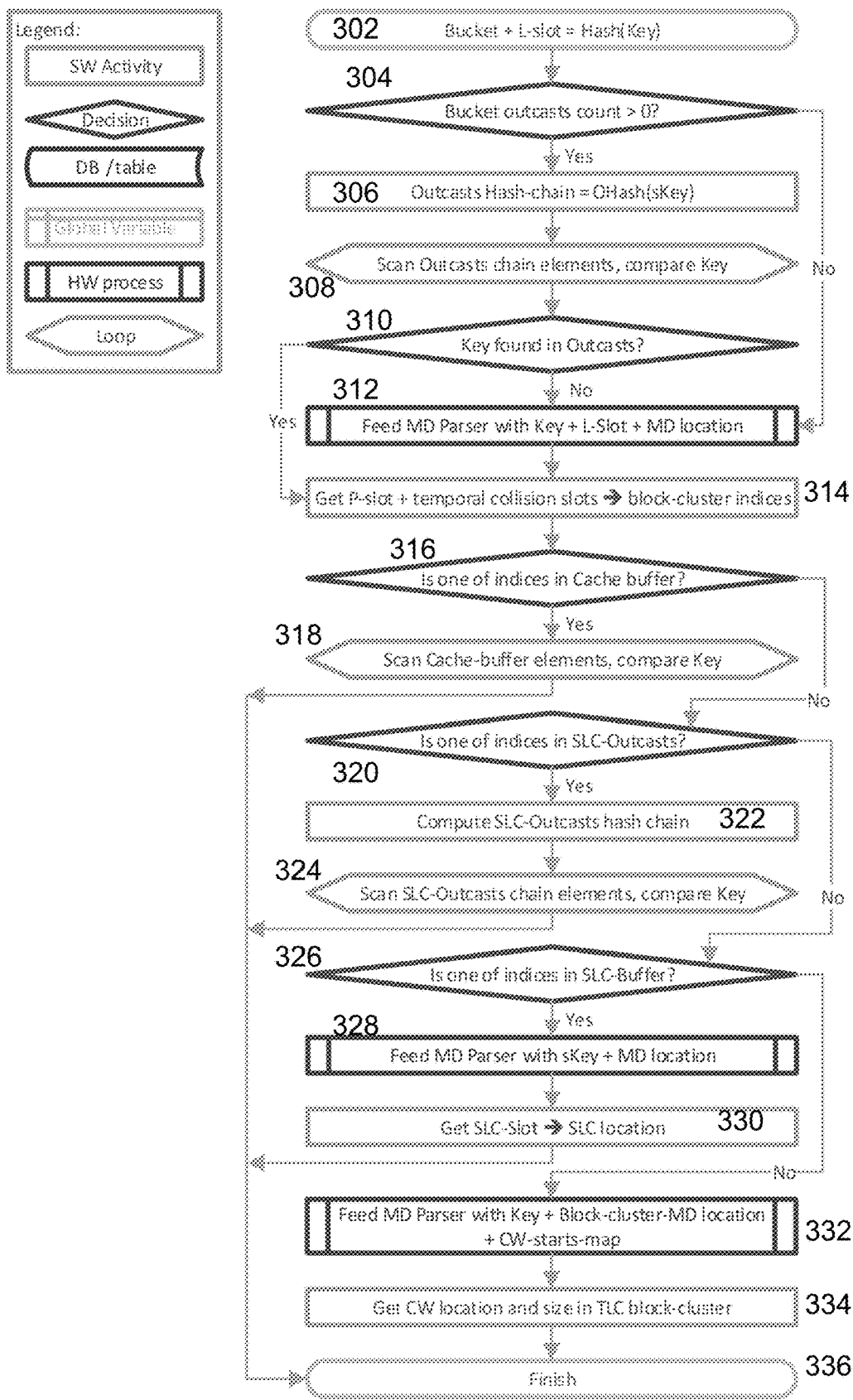
FIG. 13 is an example of a method.

FIG. 13 illustrates a method that includes steps 302, 304, 306, 308, 310, 312, 314, 316, 318, 320, 322, 324, 326, 328, 330, 332, 334 and 336.

Figure 14:
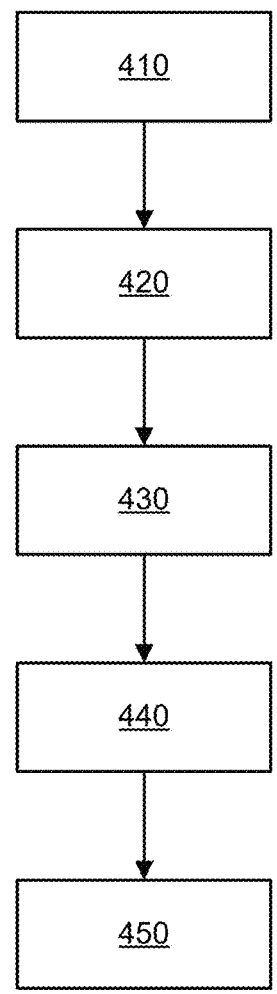
FIG. 14 is an example of a method.

FIG. 14 illustrates a method 400 for accessing a key value pair stored in a solid state drive (SSD) memory, the method may include a sequence of steps 410, 420, 430, 440 and 450.

Step 410 of calculating, by a SSD memory controller and based on an input key, a first bucket identifier and a first inter-bucket value.

Step 410 may be preceded by receiving an input key by the SSD controller and converting the input value to an intermediate key.

Step 410 may include applying a first hash function on the intermediate key to provide a first hash result and determining, based on the first hash result, the first bucket identifier and the first inter-bucket value. The first bucket may be long to a first data structure such as the data structure of FIG. 9A.

Step 410 may include accessing, using at least the first inter-bucket value, first metadata of a first bucket that may be identified by the first bucket identifier; wherein the first bucket belongs to the first data structure; and selecting, based on the first metadata, the second data structure.

Step 420 may include determining a block cluster that may store the key pair value, based on the first bucket identifier, the first inter-bucket value and first metadata of a first data structure. A second data structure (such as the data structure of FIG. 9B) may be allocated to the block cluster.

Step 430 may include calculating, based on the input key, a second bucket identifier and a second inter-bucket value.

Step 430 may include applying a second hash function on the intermediate key to provide a second hash result; and determining, based on the second hash result, the second bucket identifier and the second inter-bucket value.

Step 440 of determining key pair value retrieval information, based on the second bucket identifier, the second inter-bucket value and second metadata of a second data structure; wherein the second data structure may be allocated to the block cluster.

Step 440 may include accessing, using at least the second inter-bucket value, second metadata of a second bucket that may be identified by the second bucket identifier; wherein the second bucket belongs to the second data structure; and determining, based on the second metadata, key value pair retrieval information.

Step 450 of retrieving at least the value of the key pair value (or at least the value of the key pair value) based on the key pair value retrieval information.

The first data structure and the second data structure may not store the intermediate key.

First buckets of the first data structure may include first logical slots that store one or more second data structures identifiers. The first metadata may include (a) first slot locator metadata for selection of a first logical slot of the first logical slots, and (b) first collision separation metadata for selecting a second bucket identifier within each colliding first logical slot, wherein a colliding first logical slot may be mapped to multiple colliding intermediate keys.

The first slot locator metadata may include a binary sequence that may be indicative of a number of second bucket identifiers per each first logical slot.

The selecting of the second data structure may include searching for a second data structure identifier.

The searching for the second data structure identifier may include
(a) counting, from a most significant bit of the binary sequence, a number of zero bits that equals a value of the first inter-bucket value to find a certain bit; and
(b) setting a number of second data structure identifiers that belong to the first logical slot as a number of one bits that follows the certain bit.

The first collision separation metadata may include pre-mutation metadata; wherein the method may include obtaining, using the permutation metadata, a permutation function; and wherein the selecting of the second bucket identifier within the first logical slot may include applying the permutation function on at least a part of the intermediate value.

For each colliding first logical slot, the first collision separation metadata may include a tree that represents colliding intermediate keys that may be mapped to the colliding first logical slot.

The tree may be a sorted tree.
The tree may be an unsorted tree.

For each colliding first logical slot, each parent node of the tree has child nodes that may be associated with different intermediate key values, wherein each patent node may store information about an order of a first bit that differs by value between the different intermediate keys.

For each colliding first logical slot, each parent node of the tree has child nodes that may be associated with different intermediate key values, wherein each patent node may store information about (a) an order of a first bit that differs by value between the different intermediate keys, and (b) at least a part of a prefix that preceded the first bit.

Second buckets of the second data structure may include second logical slots that store one or more key value pairs access information; and wherein the second metadata may include (a) second slot locator metadata for selection of a second logical slot of the second logical slots, and (b) second collision separation metadata for selecting a key value pair access information within each colliding second logical slot, wherein a colliding second logical slot may be mapped to multiple colliding intermediate keys.

Each bucket may include start metadata indicating of an aggregate number of codewords that may be associated with buckets that preceded the bucket.

For each colliding second logical slot, the second collision separation metadata may include a tree that represents colliding intermediate keys that may be mapped to the colliding second logical slot. Alternatively—the second collision separation metadata may include permutation metadata.

The second data structure may store key value pair access information regarding multiple codewords that store multiple key value pairs.

The second slot locator metadata may store metadata related to all of the multiple key value pairs.

The second slot locator metadata may store metadata related to only representative key value pairs of the multiple key value pairs.

Step 440 may include (a) selecting a selected representative key value pair out of multiple representative key value pair that form only a part of the multiple key value pairs, and (b) selecting the key value pair based on the selected representative key value pair.

The second collision separation metadata may include metadata for selecting a selected representative and wherein the second metadata may include metadata for selecting between key value pairs associated with a same representative key value pair.

For each colliding second logical slot, the second collision separation metadata may include a tree that represents colliding intermediate keys that may be mapped to the colliding second logical slot.

For each colliding second logical slot, each parent node of the tree has child nodes that may be associated with different intermediate key values, wherein each patent node may store information about (a) an order of a first bit that differs by value between the different intermediate keys, and (b) at least a part of a prefix that preceded the first bit; wherein the prefix may be used for selecting between key value pairs associated with a same representative key value pair.

The second metadata may include second logical slots, a second slot locator and second collision separation metadata. At least the second slot locator may include metadata only on representative key-pair values that may be a subset of multiple key-pair values stored in the block cluster.

Figure 15:
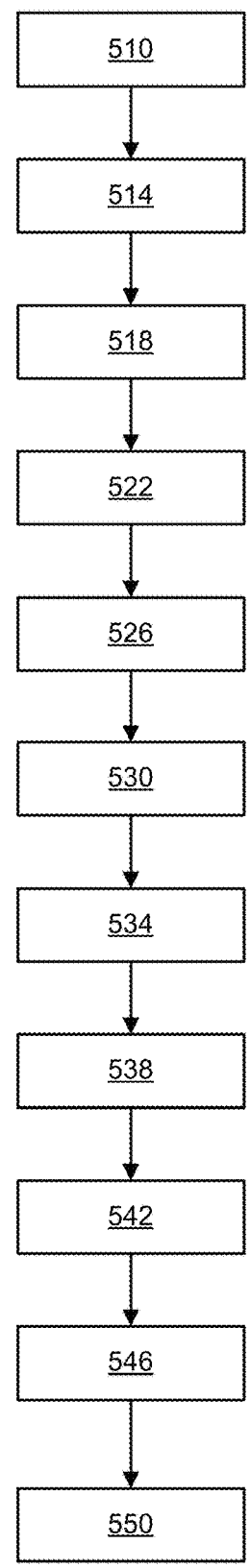
FIG. 15 is an example of a method.

FIG. 15 illustrates method 500.

Method 500 may be for accessing a key value pair stored in a solid state drive (SSD) memory.

Method 500 may start by step 510 of receiving by a SSD controller an input key.

Step 510 may be followed by step 514 of converting the input value to an intermediate key. The intermediate key was also referred to as an ikey.

Step 514 may be followed by step 518 of applying a first hash function on the intermediate key to provide a first hash result.

Step 518 may be followed by step 522 of determining, based on the first hash result, a main bucket identifier and a main inter-bucket value.

Step 522 may be followed by step 526 of accessing, using at least the main inter-bucket value, main metadata of a main bucket that may be identified by the main bucket identifier; wherein the main bucket belongs to a main data structure.

Step 526 may be followed by step 530 of selecting, based on a content of the main metadata, a secondary data structure that may be allocated to a block cluster.

Step 530 may be followed by step 534 of applying a second hash function on the intermediate key to provide a second hash result.

Step 534 may be followed by step 538 of determining, based on the second hash result, a secondary bucket identifier and a secondary inter-bucket value.

Step 538 may be followed by step 542 of accessing, using at least the secondary inter-bucket value, secondary metadata of a secondary bucket that may be identified by the secondary bucket identifier; wherein the secondary bucket belongs to a secondary data structure.

Step 542 may be followed by step 546 of determining, based on a content of the secondary metadata, object access information; wherein an object may be a value associated with the input key.

Step 546 may be followed by step 550 of retrieving a value of the object using the object access information.

The main data structure and the secondary data structure do not store the intermediate key.

Figure 16:
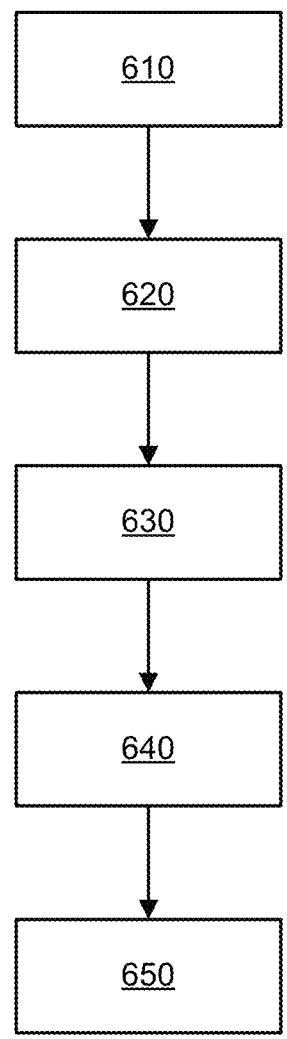
FIG. 16 is an example of a method.

FIG. 16 illustrates method 600 for accessing a key value pair stored in a solid state drive (SSD) memory, the method may include a sequence of steps 610, 620, 630, 640 and 650.

Step 610 may include calculating, by a SSD memory controller and based on an input key, a first bucket identifier and a first inter-bucket value.

Step 610 may be preceded by receiving an input key by the SSD controller; converting the input value to an intermediate key.

Step 610 may include applying a first hash function on the intermediate key to provide a first hash result; and determining, based on the first hash result, the first bucket identifier and the first inter-bucket value.

Step 620 may include determining a block cluster that may store the key pair value, based on the first bucket identifier, the first inter-bucket value and first metadata of a first data structure.

Step 620 may include accessing, using at least the first inter-bucket value, first metadata of a first bucket that may be identified by the first bucket identifier; wherein the first bucket belongs to the first data structure; and selecting, based on the first metadata, the second data structure.

Step 620 may include searching for a second data structure identifier (that identifies the second data structure). The searching may include: (a) counting, from a most significant bit of the binary sequence, a number of zero bits that equals a value of the first inter-bucket value to find a certain bit; and (b) setting a number of second data structure identifiers that belong to the first logical slot as a number of one bits that follows the certain bit.

An example of the second data structure is in FIG. 9C.

Step 630 may include calculating, based on the input key, a second bucket identifier and a second inter-bucket value.

Step 630 may include applying a second hash function on the intermediate key to provide a second hash result; and determining, based on the second hash result, the second bucket identifier and the second inter-bucket value.

Step 640 may include determining at least one of a key pair value retrieval information and a representative key pair value retrieval information, based on the second bucket identifier, the second inter-bucket value and second metadata of a second data structure; wherein the second data structure may be allocated to the block cluster; wherein the second metadata may include second logical slots, a second slot locator and second collision separation metadata; wherein at least the second slot locator may include metadata only on representative key-pair values that may be a subset of multiple key-pair values stored in the block cluster.

Step 640 may include determining only the key pair value retrieval information.

Step 640 may include determining only the representative key pair value retrieval information.

Step 650 may include retrieving at least the value of the key pair value based on the at least one of the key pair value retrieval information and the representative key pair value retrieval information.

Step 650 may include retrieving content that may include (a) the key pair value, and (b) at least a part of a representative key-pair value associated with the key pair value.

Step 650 may include retrieving content that may include (a) the key pair value, (b) at least a part of a representative key-pair value that precedes the key pair value, and (c) at least a part of a representative key-pair value that follows the key pair value.

Step 650 may include finding a representative key-pair value associated with the key pair value, and finding, based on the representative key-pair value, the key pair value.

The first data structure and the second data structure do not store the intermediate key.

The first buckets of the first data structure may include first logical slots that store one or more second data structures identifiers; and wherein the first metadata may include (a) first slot locator metadata for selection of a first logical slot of the first logical slots, and (b) first collision separation metadata for selecting a second bucket identifier within each colliding first logical slot, wherein a colliding first logical slot may be mapped to multiple colliding intermediate keys.

The first slot locator metadata may include a binary sequence that may be indicative of a number of second bucket identifiers per each first logical slot.

The selecting of the second data structure may include searching for a second data structure identifier.

The first collision separation metadata may include premutation metadata; wherein the method may include obtaining, using the permutation metadata, a permutation function; and wherein the selecting of the second bucket identifier within the first logical slot may include applying the permutation function on at least a part of the intermediate value.

For each colliding first logical slot, the first collision separation metadata may include a tree that represents colliding intermediate keys that may be mapped to the colliding first logical slot.

The tree may be a sorted tree.

The tree may be an unsorted tree.

For each colliding first logical slot, each parent node of the tree has child nodes that may be associated with different intermediate key values, wherein each patent node may store information about an order of a first bit that differs by value between the different intermediate keys.

For each colliding first logical slot, each parent node of the tree has child nodes that may be associated with different intermediate key values, wherein each patent node may store information about (a) an order of a first bit that differs by value between the different intermediate keys, and (b) at least a part of a prefix that preceded the first bit.

The wherein second buckets of the second data structure may include second collision separation metadata for selecting at least one of (a) a key value pair access information and (b) a representative key value pair access, within each colliding second logical slot, wherein a colliding second logical slot may be mapped to multiple colliding intermediate keys.

The wherein each bucket may include start metadata indicating of an aggregate number of codewords that may be associated with buckets that preceded the bucket.

For each colliding second logical slot, the second collision separation metadata may include a tree that represents colliding intermediate keys that may be mapped to the colliding second logical slot.

The second data structure may store key value pair access information regarding multiple codewords that store multiple key value pairs.

This application provides a significant technical improvement over the prior art—especially an improvement in computer science.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for accessing a key value pair stored in a solid state drive (SSD) memory, the method comprises:
calculating, by a SSD memory controller and based on an input key, a first bucket identifier and a first inter-bucket value;
determining a block cluster that stores the key pair value, based on the first bucket identifier, the first inter-bucket value and first metadata of a first data structure;
calculating, based on the input key, a second bucket identifier and a second inter-bucket value;
determining key pair value retrieval information, based on the second bucket identifier, the second inter-bucket value and second metadata of a second data structure; wherein the second data structure is allocated to the block cluster; and
retrieving at least the value of the key pair value based on the key pair value retrieval information.

2. The method according to claim 1 comprises: receiving an input key by the SSD controller; converting the input value to an intermediate key; and wherein the calculating of the first bucket identifier and the first inter-bucket value comprises applying a first hash function on the intermediate key to provide a first hash result; and determining, based on the first hash result, the first bucket identifier and the first inter-bucket value.

3. The method according to claim 2 wherein the determining of the block cluster comprises: accessing, using at least the first inter-bucket value, first metadata of a first bucket that is identified by the first bucket identifier; wherein the first bucket belongs to the first data structure; and selecting, based on the first metadata, the second data structure.

4. The method according to claim 3 comprises: receiving an input key by the SSD controller; converting the input value to an intermediate key; and wherein the calculating of the second bucket identifier and the second inter-bucket value comprises applying a second hash function on the intermediate key to provide a second hash result; and determining, based on the second hash result, the second bucket identifier and the second inter-bucket value.

5. The method according to claim 4 wherein the determining of the key pair value retrieval information comprises accessing, using at least the second inter-bucket value, second metadata of a second bucket that is identified by the second bucket identifier; wherein the second bucket belongs to the second data structure; and determining, based on the second metadata, key value pair retrieval information.

6. The method according to claim 5, wherein the first data structure and the second data structure do not store the intermediate key.

7. The method according to claim 5, wherein first buckets of the first data structure comprise first logical slots that store one or more second data structures identifiers; and wherein the first metadata comprises (a) first slot locator metadata for selection of a first logical slot of the first logical slots, and (b) first collision separation metadata for selecting a second bucket identifier within each colliding first logical slot, wherein a colliding first logical slot is mapped to multiple colliding intermediate keys.

8. The method according to claim 7, wherein the first slot locator metadata comprises a binary sequence that is indicative of a number of second bucket identifiers per each first logical slot.

9. The method according to claim 7, wherein the selecting of the second data structure comprises searching for a second data structure identifier.

10. The method according to claim 9, wherein the searching for the second data structure identifier comprises:
(a) counting, from a most significant bit of the binary sequence, a number of zero bits that equals a value of the first inter-bucket value to find a certain bit; and
(b) setting a number of second data structure identifiers that belong to the first logical slot as a number of one bits that follows the certain bit.

11. The method according to claim 7, wherein the first collision separation metadata comprises premutation metadata; wherein the method comprises obtaining, using the permutation metadata, a permutation function; and wherein the selecting of the second bucket identifier within the first logical slot comprises applying the permutation function on at least a part of the intermediate value.

12. The method according to claim 7, wherein for each colliding first logical slot, the first collision separation metadata comprises a tree that represents colliding intermediate keys that are mapped to the colliding first logical slot.

13. The method according to claim 12 wherein the tree is a sorted tree.

14. The method according to claim 12 wherein the tree is an unsorted tree.

15. The method according to claim 12 wherein for each colliding first logical slot, each parent node of the tree has child nodes that are associated with different intermediate key values, wherein each patent node stores information about an order of a first bit that differs by value between the different intermediate keys.

16. The method according to claim 12 wherein for each colliding first logical slot, each parent node of the tree has child nodes that are associated with different intermediate key values, wherein each patent node stores information about (a) an order of a first bit that differs by value between the different intermediate keys, and (b) at least a part of a prefix that preceded the first bit.

17. The method according to claim 5, wherein second buckets of the second data structure comprise second logical slots that store one or more key value pairs access information; and wherein the second metadata comprises (a) second slot locator metadata for selection of a second logical slot of the second logical slots, and (b) second collision separation metadata for selecting a key value pair access information within each colliding second logical slot, wherein a colliding second logical slot is mapped to multiple colliding intermediate keys.

18. The method according to claim 17, wherein each bucket comprises start metadata indicating of an aggregate number of codewords that are associated with buckets that preceded the bucket.

19. The method according to claim 17, wherein for each colliding second logical slot, the second collision separation metadata comprises a tree that represents colliding intermediate keys that are mapped to the colliding second logical slot.

20. The method according to claim 17, wherein the second data structure stores key value pair access information regarding multiple codewords that store multiple key value pairs.

21. The method according to claim 20, wherein the second slot locator metadata stores metadata related to all of the multiple key value pairs.

22. The method according to claim 20, wherein the second slot locator metadata stores metadata related to only representative key value pairs of the multiple key value pairs.

23. The method according to claim 22, wherein the determining of the key value pair access information comprises (a) selecting a selected representative key value pair out of multiple representative key value pair that form only a part of the multiple key value pairs, and (b) selecting the key value pair based on the selected representative key value pair.

24. The method according to claim 22, wherein the second collision separation metadata comprises metadata for selecting a selected representative and wherein the second metadata comprises metadata for selecting between key value pairs associated with a same representative key value pair.

25. The method according to claim 22, wherein for each colliding second logical slot, the second collision separation metadata comprises a tree that represents colliding intermediate keys that are mapped to the colliding second logical slot.

26. The method according to claim 25, wherein for each colliding second logical slot, each parent node of the tree has child nodes that are associated with different intermediate key values, wherein each patent node stores information about (a) an order of a first bit that differs by value between the different intermediate keys, and (b) at least a part of a prefix that preceded the first bit; wherein the prefix is used for selecting between key value pairs associated with a same representative key value pair.

27. The method according to claim 1 wherein the second metadata comprises second logical slots, a second slot locator and second collision separation metadata; wherein at least the second slot locator comprise metadata only on representative key-pair values that are a subset of multiple key-pair values stored in the block cluster.

28. The method according to claim 1 wherein at least one first bucket is linked to a first extension bucket; and wherein the method comprises accessing the first extension bucket.

29. The method according to claim 1 wherein at least one second bucket is linked to a second extension bucket; and wherein the method comprises accessing the second extension bucket.

30. The method according to claim 1 wherein first buckets of the first data structure comprises first metadata field of fixed length.

31. The method according to claim 1 wherein second buckets of the second data structure comprises second metadata field of fixed length.

32. A non-transitory computer readable medium that stores instructions that once executed by a solid state drive (SSD) memory controller cause the SSD memory controller to execute the steps of: calculating, by a SSD memory controller and based on an input key, a first bucket identifier and a first inter-bucket value; determining a block cluster that stores the key pair value, based on the first bucket identifier, the first inter-bucket value and first metadata of a first data structure; calculating, based on the input key, a second bucket identifier and a second inter-bucket value; determining key pair value retrieval information, based on the second bucket identifier, the second inter-bucket value and second metadata of a second data structure; wherein the second data structure is allocated to the block cluster; and retrieving a key pair value based on the key pair value retrieval information.

33. A system for accessing a key value pair stored in a solid state drive (SSD) memory, the system comprises an SSD memory that is configured to execute the steps of: calculating, by a SSD memory controller and based on an input key, a first bucket identifier and a first inter-bucket value; determining a block cluster that stores the key pair value, based on the first bucket identifier, the first inter-bucket value and first metadata of a first data structure; calculating, based on the input key, a second bucket identifier and a second inter-bucket value; determining key pair value retrieval information, based on the second bucket identifier, the second inter-bucket value and second metadata of a second data structure; wherein the second data structure is allocated to the block cluster; and retrieving a key pair value based on the key pair value retrieval information.

* * * * *